United States Patent
Groves

(10) Patent No.: US 12,499,017 B2
(45) Date of Patent: Dec. 16, 2025

(54) SNAPSHOT BASED MEMORY CHECKPOINT COPY

(71) Applicant: Micron Technology, Inc., Boise, ID (US)

(72) Inventor: John M. Groves, Austin, TX (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/762,217

(22) Filed: Jul. 2, 2024

(65) Prior Publication Data
US 2025/0028611 A1  Jan. 23, 2025

Related U.S. Application Data

(60) Provisional application No. 63/527,459, filed on Jul. 18, 2023.

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
CPC ... G06F 11/14; G06F 11/1469; G06F 2201/84
See application file for complete search history.

(56) References Cited

U.S. PATENT DOCUMENTS

| | | | |
|---|---|---|---|
| 7,502,801 B2 * | 3/2009 | Sawdon | G06F 16/174 |
| 7,523,149 B1 * | 4/2009 | Sridharan | G06F 11/1456 |
| | | | 707/999.102 |
| 10,909,004 B1 * | 2/2021 | Chen | G06F 11/1469 |
| 12,229,023 B2 * | 2/2025 | Pabón | G06F 11/108 |
| 2005/0132250 A1 * | 6/2005 | Hansen | G06F 11/2097 |
| | | | 714/5.11 |
| 2011/0191295 A1 * | 8/2011 | Ozdemir | G06F 11/1466 |
| | | | 707/639 |
| 2011/0289289 A1 * | 11/2011 | Leshinsky | G06F 11/1448 |
| | | | 711/E12.103 |
| 2022/0027059 A1 * | 1/2022 | Chen | G06F 3/0689 |
| 2022/0091942 A1 * | 3/2022 | Mukku | G06F 11/1464 |
| 2022/0100608 A1 * | 3/2022 | Yu | G06F 11/1446 |
| 2023/0273861 A1 * | 8/2023 | Nazari | G06F 8/63 |
| | | | 714/20 |
| 2023/0350767 A1 * | 11/2023 | Reza | G06F 3/0613 |
| 2024/0069758 A1 * | 2/2024 | Groves | G06F 3/0625 |
| 2025/0028611 A1 * | 1/2025 | Groves | G06F 11/1469 |
| 2025/0231706 A1 * | 7/2025 | Schuh | G06F 3/0604 |

* cited by examiner

*Primary Examiner* — Kamini B Patel
(74) *Attorney, Agent, or Firm* — Lowenstein Sandler LLP

(57) ABSTRACT

A system can include a memory device and a processing device operatively coupled with the memory device, to perform operations of maintaining a set of data items reflective of a state of a host application and receiving a first request to make a checkpoint copy of the state of the host application. The operations can also include responsive to receiving the first request, associating a snapshot identifier with the object identifier, and receiving a second request to modify a data item of the set of data items at the first set of physical address ranges. They can also include executing the second request by recording a modification a data item exclusively at a second set of physical address ranges and making the checkpoint copy by copying the set of data items of the snapshot from the first set of physical address ranges to a second memory device.

20 Claims, 10 Drawing Sheets

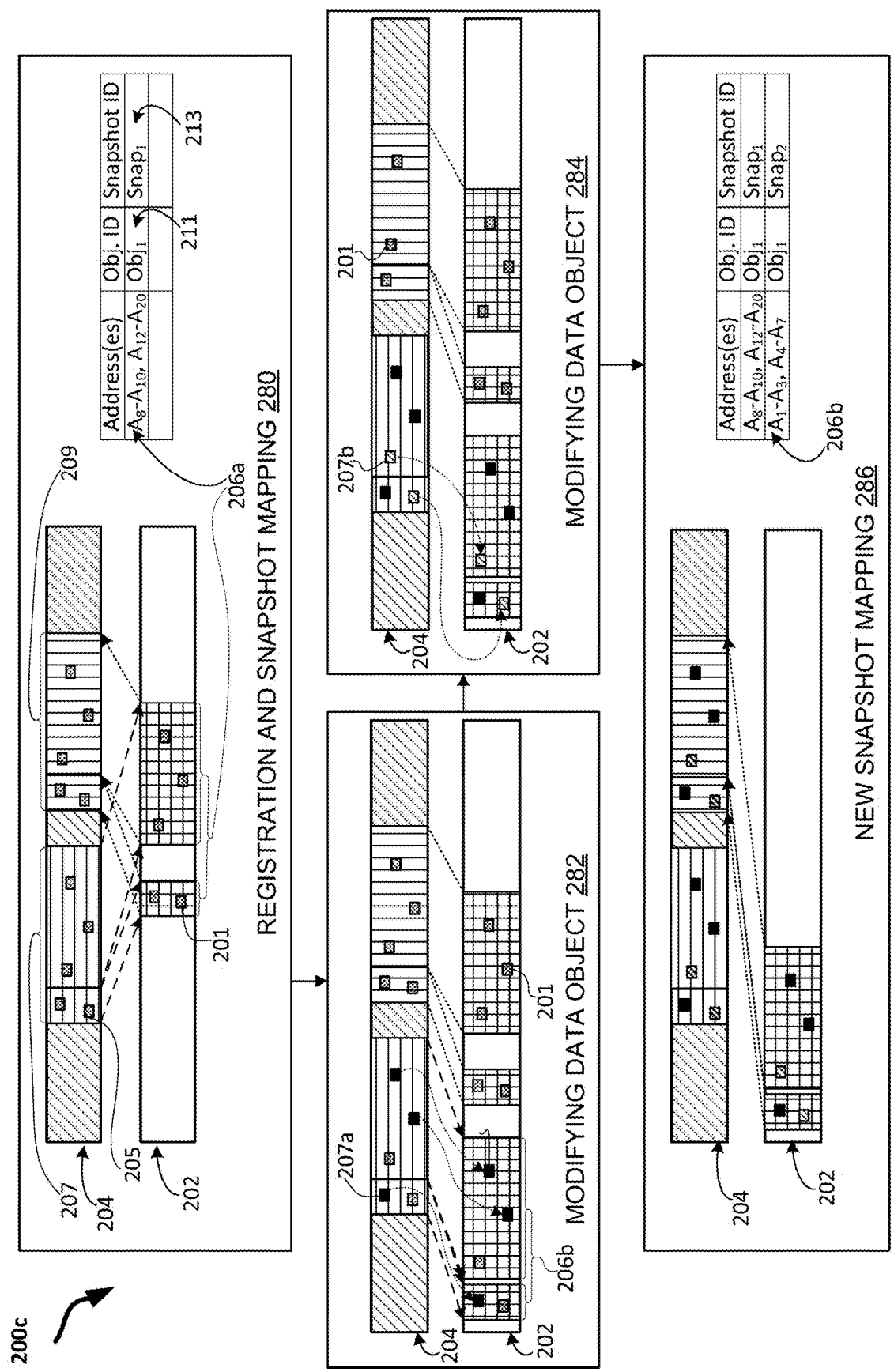

SNAPSHOT BASED MEMORY CHECKPOINT COPY

CROSS REFERENCE TO RELATED APPLICATIONS

This application claims the priority benefit of U.S. Provisional Application No. 63/527,459 filed on Jul. 18, 2023, which is incorporated by reference herein.

TECHNICAL FIELD

Embodiments of the disclosure relate generally to memory sub-systems, and more specifically, relate to managing checkpoint copies of program states using shared memory snapshots on memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2C depicts a sequence of block diagrams illustrating example snapshot management operations with corresponding example states of physical address space and virtual address space in accordance with some embodiments of the present disclosure;

DETAILED DESCRIPTION

Figure 1A:
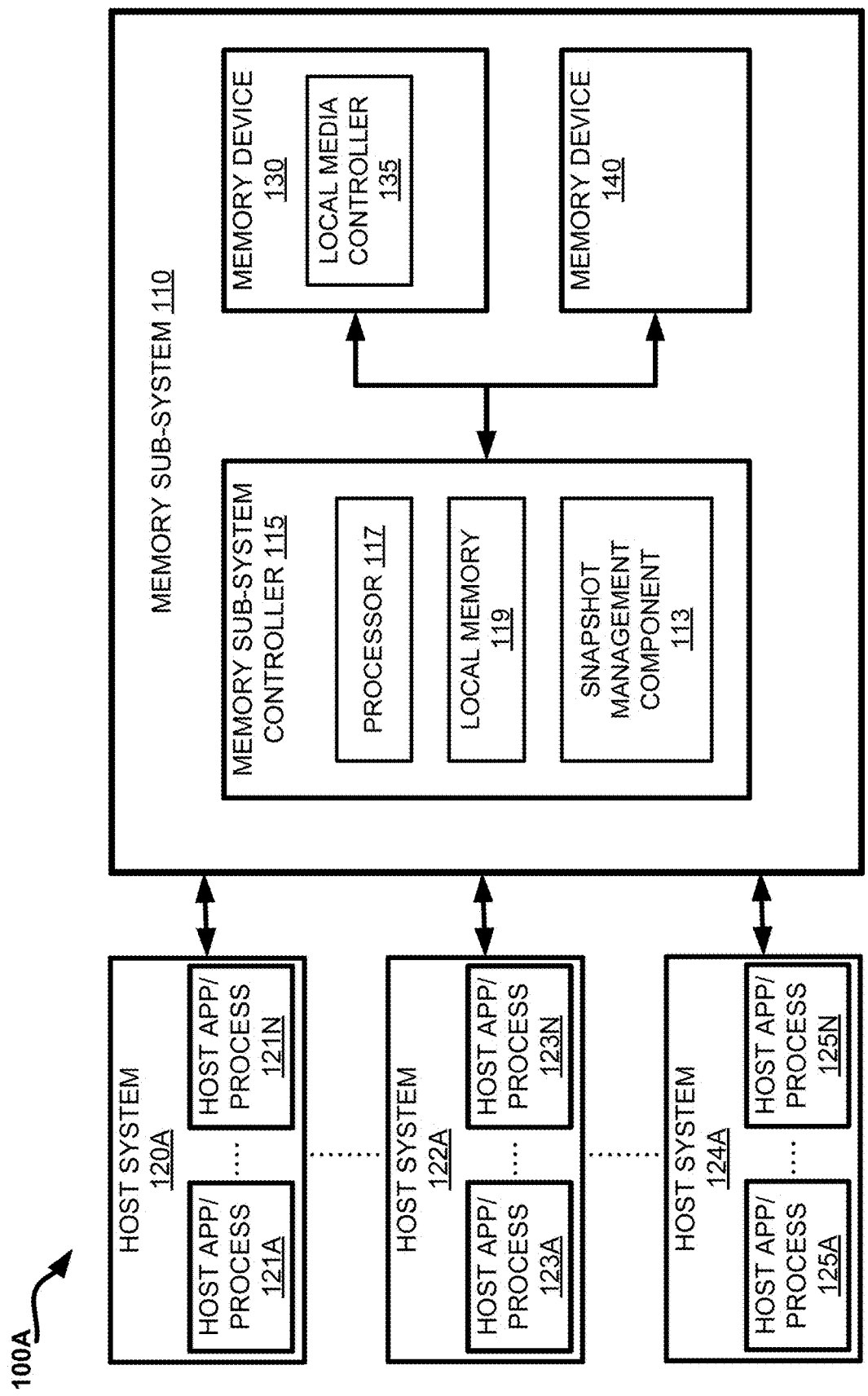
FIG. 1A illustrates an example computing system that includes a memory sub-system in accordance with some embodiments of the present disclosure.

Aspects of the present disclosure are directed to managing copies of program states using shared memory snapshots on memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. In some embodiments, the memory sub-system can utilize one or more memory devices, including any combination of the different types of non-volatile memory devices and/or volatile memory devices, to store the data provided by the host system. One example of non-volatile memory devices is a negative-and (NAND) type flash memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane can include of a set of physical blocks. In some embodiments, each block can include multiple sub-blocks. Each block can include of a set of pages. Each page can consist of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include cells arranged in a two-dimensional or three-dimensional grid. Memory cells can be formed onto a silicon wafer in an array of columns connected by conductive lines (also hereinafter referred to as strings, bitlines, or BLs) and rows connected by conductive lines (also hereinafter referred to as wordlines or WLs). A wordline can refer to a conductive line that connects control gates of a set (e.g., one or more rows) of memory cells of a memory device that are used with one or more bitlines to generate the address of each of the memory cells. In some embodiments, each plane can carry an array of memory cells formed onto a silicon wafer and joined by conductive BLs and WLs, such that a wordline joins multiple memory cells forming a row of the array of memory cells, while a bitline joins multiple memory cells forming a column of the array of memory cells. The intersection of a bitline and wordline constitutes the address of the memory cell. A block hereinafter refers to a unit of the memory device used to store data and can include a group of memory cells, a wordline group, a wordline, or individual memory cells addressable by one or more wordlines. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

High-performance computing (HPC) applications, such as large-scale numerical simulations, data analysis, and machine learning, can involve the use of large amounts of memory bandwidth and capacity to perform their computations. In this regard, the computing industry continually expands the resource consumption of the memory architectures that are in use and its growing demands further highlight the benefits of increased memory bandwidth and capacity. Some memory architectures, such as DDR and GDDR, can often be unable to fully meet these demands, resulting in limitations in performance and scalability.

Accordingly, some computing environments have increasingly become more reliant on the use of fabric-attached memory (FAM) devices such as persistent memory (PMEM) devices. In the context of these computing environments, the term "fabric" can refer to interconnected communication paths that route signals on major components of a chip or between chips of a computing system. This "fabric" can form the architecture of interconnections between processing or compute nodes within a computing device or between multiple computing devices. In this context, processing nodes and compute nodes refer to processing devices operating as nodes on an interconnected network. Fabric-attached memory can refer to a memory architecture in which the memory is connected to the CPU through a fabric interconnect, rather than being directly connected to the CPU. This allows for the memory to be located at a distance from the CPU and can provide benefits such as improved scalability and fault tolerance. For example, in some systems, the fabric includes a bus or a set of connections that connect the processing device of the system to peripheral devices and other processing devices. In other systems, the fabric can also include a set of network connections between combinations of respective compute nodes and memory nodes. In various systems, the fabric acts as an interconnect to create a network of interconnected devices that work together as a single entity. This unified framework incorporates many interconnected devices via the fabric (i.e., like many threads woven together to create a cohesive whole) to provide fast and reliable communication between the devices. In this context, an "interconnect" can refer to a device or system that connects multiple devices or subsystems together to allow them to communicate and exchange data.

FAM devices can include local memory devices connected to a processing device through a high-speed bus (e.g., a Peripheral Component Interconnect Express (PCIe) bus) as well as remote memory devices connected indirectly to a processing device (i.e., devices located on a different chip or housed in a different enclosure than the processing device) via a network connection interface utilizing the high-speed bus. One such interface that can be used in FAM device where the memory is connected to the CPU via a fabric interconnect, is the compute express link (CXL) interface, which is an interface that can support several protocols that can run on top of PCIe, including a CXL.io protocol, a CXL.mem protocol, and a CXL.cache protocol, described in more detail below. CXL is a type of memory architecture that, in contrast to other architectures, can provide a high-bandwidth, low-latency interconnect between the CPU and memory. CXL can also permit the sharing of memory resources between multiple compute elements, such as processors, accelerators, and other memory devices. Furthermore, CXL enables the use of shared byte-addressable memory. This allows for the memory to be accessed and shared at the bit level, rather than the block level.

FAM is a type of memory (e.g., a FAM device in a CXL architecture) that can be accessed by one or more processors of a single computing system, or by multiple processors, each of which can be on different local computing systems. In some cases, FAM PMEM devices allow multiple processing threads or multiple processing systems to access the same data objects stored on the memory. For example, different processes on a single processing device can access the same data object on a FAM. Similarly, FAM can enable different processing devices on different host systems to access the same data object on a memory device. FAM PMEM devices can include high-density, byte-addressable, storage-class, non-volatile memory (NVM) and low-latency interconnects allowing FAM devices to be shared across heterogeneous and decentralized compute nodes. In some systems, the same physical address space of a FAM PMEM device can be available to multiple different processes or different processing devices. Consequently, that physical address space can be mapped to multiple respective virtual (e.g., logical) address spaces used by the different processes or by different processing devices. The virtual address spaces can contain addresses corresponding to physical memory locations found in processing device caches, random access memory (RAM) devices, and FAM PMEM devices.

Thus, systems utilizing FAM devices allow data objects created by one process or application running on a host processing device (such process or application referred to herein as a "producer" as further defined below) to be accessed by another host process or application (such process or application referred to herein as a "consumer" as further defined below). Generally, a producer creates, maintains, and updates data objects in the memory while a consumer accesses or reads the data objects. Accordingly, at a particular point in time there can be a part of the data object in the producer's cache, in the memory device, and in one or more consumers' caches (i.e., when a producer has read-cached a part of the data). The cache of a processing device of a host system on which a producer application is executing (i.e., the cache of the producer) can be considered to be the "source of truth" with respect to the current state of an item of data for the purposes of this disclosure. Accordingly, if data in memory is fetched from the producer's cache, it, by definition, can be considered to not be "stale" (i.e., outdated) since the cache contains the master copy of the data (i.e., the reference copy of the data to which other copies of the data are compared) when data exists in both the cache and a memory device.

To address (i) situations where caches associated with the producer (e.g., producer processor caches) are not shared or associated with the consumer and (ii) situations where inconsistencies are created as modified cache lines are written back to the memory device out of order some systems can implement various memory sharing techniques. For example, these systems can share memory objects as network messages, via remote direct memory access (RDMA), via transactional updating of shared memory objects, via a read-copy-update (RCU) mechanism. These approaches can involve making a copy of the object and moving the copy across a network to be stored on a remote memory location, can result in complex consumer operation synchronization requirements, and can impose limits on access to a part of a data object that is being updated on the memory device (or require knowledge of potential access requests from multiple remote consumers to coordinate synchronization that ensures that a consumer isn't accessing a part of the data object that is undergoing modification by the producer). These approaches often quickly become resource intensive and time-consuming as the data of a memory object (e.g., a memory object reflective of an application state) increases.

Furthermore, HPC applications may also benefit from methods used to recover from failures and continue the computation without losing the progress made so far. Checkpointing refers to periodically saving the state of a running application so that it can be resumed from that point in case of a failure. This can be accomplished by saving the state of the application. The state of the application can include the values of the variables used in the application, the memory contents, the position of the instruction pointer, as well as the pointers and contents of other registers associated with the application, all of which can be saved to a file or a set of files. Checkpointing can be implemented in various ways, including full-state checkpointing, incremental checkpointing, selective checkpointing, hybrid checkpointing, and multi-level checkpointing. Full-state checkpointing can involve saving the entire state of the application, including the values of all variables, the memory layout, and the position of the instruction pointer. This method can provide the highest level of fault tolerance, but can therefore also consume the most storage space and can take longer to save and restore the state. Incremental checkpointing can involve saving the changes of the state of the application at regular intervals, rather than saving the entire state at once. Thus, this approach can use less storage space and can be faster than full-state checkpointing, but it may not provide the same level of fault tolerance. Selective checkpointing can include saving only the selected state information, such as the values of certain variables or the state of specific data structures. Accordingly, it can use even less storage space and can be even faster than full-state checkpointing, but it can likewise provide an even lower level of fault tolerance. Hybrid checkpointing can include combining multiple checkpointing methods to balance the trade-offs between fault tolerance, storage space, and save/restore time, while multi-level checkpointing can include saving the state of the application at different levels of granularity to balance between the required level of fault-tolerance, storage space, and save/restore time.

When checkpoint copies are made, the application along with its constituent program processes remain idle while the state of the application is saved to a file or a set of files. This is because checkpointing depends on a consistent and accurate snapshot of the state of the application at a point in time. If the constituent program processes were to continue running while the checkpoint copy is being made, the state of the application would be in flux and the resulting snapshot may not be an accurate representation of the state of the application. This could lead to issues when trying to resume the application from the checkpoint copy, as the state may be inconsistent or incomplete. Additionally, making a checkpoint copy also can also consume a significant amount of system resources, such as CPU and I/O. If the constituent program processes of the application were to continue running while the checkpoint copy is being made, it could cause resource contention and negatively impact the performance of the application.

However, because the constituent program processes of the application remain idle while checkpoint copies are made (e.g., in order to ensure that the checkpoint copy is accurate and consistent and to prevent resource contention), as the amount of data describing the state of the application increases, so does the idle time (also referred to herein as "stop time", i.e., the time during which the constituent program processes of the application are stopped or quiesced). Thus, with increased complexity of the application being checkpointed and with increased complexity of the state being checkpointed, the stop time also increases. Moreover, the increased duration of the idle time is further exacerbated by having checkpoint copies saved to target media that is of lower latency (e.g., hard drive, or flash memory). Accordingly, this approach results in a significant amount of wasted computational time during which the application and its component programs are stopped. Furthermore, this approach also limits the applicability of checkpointing to situations where there is a large tolerance for job stop-time and makes it impractical for situations where tolerance for job stop-time is low (e.g., if the data structure that is being checkpointed is being updated by a real-time or near real-time data stream).

Aspects of the present disclosure address the above and other deficiencies by a memory sub-system that makes checkpoint copies of application states using shared memory snapshots on memory devices. Various embodiments described herein can incorporate FAM devices that permit shared memory access. For the purposes of this disclosure, the term "application" can refer to one or more programs and processes that make up the application. Similarly, the term "application state" can collectively refer to the information reflecting a state of an application including the state of one or more of its constituent programs and processes. To enable checkpoint copies to be made while a data object continues to be modified by an application, embodiments described herein utilize snapshot-based shared access to the data of a data object (e.g., data objects that reflect a state of an application) on a FAM device. More specifically, in the embodiments described herein, the memory subsystem can create snapshots of the data structure (e.g., the data object) containing the information from which the state of the application whose checkpoint copy is to be made can be reproduced. The snapshot can be created on persistent FAM that is utilized within a CXL architecture.

For example, some embodiments can implement a snapshot technique that distinguishes between a data object and a snapshot of the data object that may occupy some of the same physical locations on the FAM device using partially overlapping memory mapping approaches to maintain data consistency from the perspectives of both the producer and the consumer. In these embodiments, a memory sub-system can manage shared snapshots of data objects in memory and can ensure consistency of the data. More specifically, the memory subsystem can define snapshots of data objects on a memory device in a manner that isolates producer modifications (i.e., writes) and accesses (i.e., reads) to the data object from consumer accesses (i.e., reads) to the snapshots of the data objects. In some embodiments, consumer accesses can be confined to a particular snapshot of a data object so that they are not affected by producer modifications or updates of the data object on the memory device. With respect to a particular data object, the term "producer" refers to an application, being executed on a processing device of a host system, that creates and/or modifies the data object (i.e., has read/write access). Similarly, with respect to a particular data object, the term "consumer" refers to an application, being executed on a processing device of a host system, that reads the data object that has previously been created by another application (producer) (i.e., has read-only access). As described in more detail below, by associating one set of memory address ranges with a data object (e.g., the address ranges identifying the locations on the memory device storing the data of the data object) and associating a different set of memory address ranges with a snapshot of the data object (e.g., the address ranges identifying the locations on the memory device storing the data of the snapshot), the snapshot of the data object can be distinguished from the data object. The address ranges of the data object and the address ranges of the snapshot of the data object can overlap such that the portions of data stored in the overlapping address ranges are common to both the data object and the snapshot of the data object. In the several embodiments described in more detail below, the consumer can read a data object by accessing a particular snapshot (e.g., by referencing a specific snapshot ID) of the data object on the memory device. In comparison, the producer can have more permissive capabilities, and can have both read and write access such that it can create the particular snapshots of the data object as well as read and modify the data object directly.

In some embodiments the memory sub-system can receive a data object (e.g., a data structure reflective of a state of some application) from a producer (e.g., a different application) and can store it on a memory device (e.g., a CXL FAM device). The memory sub-system can assign an object identifier to the data object and associate it, in an item of metadata in a data structure, with a set of one or more physical address ranges or physical address extent-lists (i.e., non-contiguous address ranges) that identify respective locations storing the data of the data object on the memory device to "register" the data object on the memory device and to indicate that the data object is subject to snapshotting. The memory sub-system can map these physical address ranges to corresponding virtual address ranges within the virtual address space available to the producer. As data gets processed by the producer and an application state changes, those changes can be recorded by modifying the data object on the memory device. The various embodiments described in the present disclosure can have different ways of handling modifications or changes that a producer makes to the data object. For example, the changes can be made to a duplicate copy of the data object, the changes can be collected in a change log containing modified data, or the changes can be made to the data object while previous states of the changed data can be collected in a change log containing unmodified data. The processing performed by the producer (e.g., the processing of an application) can be paused or quiesced along with pausing the modification of the data object to create a snapshot of the data object on the memory device.

To "create" a snapshot of a data object, in some embodiments, the memory subsystem can associate, in an item of metadata, a snapshot identifier with a set of one or more address ranges that differs from the set of one or more address ranges associated with the data object. The item of metadata can be the same item where the object identifier is associated with its set of one or more address ranges. The set of one or more address ranges that are associated with the snapshot identifier can identify respective locations storing the data of the snapshot and can associate the object (e.g., by reference to its object identifier) with the snapshot identifier.

In the embodiments described herein, once the snapshot is created, a checkpoint copy of the application state can be made from the snapshot of the data object instead of the data object itself. This can be done by copying the snapshot (i.e., the data of the snapshot of the data object contained in its corresponding set of address ranges) to another location. The memory subsystem can create checkpoint copies of the state of the application in another location (e.g., another memory device) by making a copy of the snapshot from the memory device. Accordingly, once a snapshot of the data object is created, modification of the data object can continue. Therefore, the application (i.e., its constituent programs) can be resumed such that processing and modification of data can continue along with any corresponding changes to the data object that are to be made in the course of the operation of the application.

Regardless of the amount of time that it takes to create a checkpoint copy of the application state, the application, in the various embodiments, can resume processing as soon as the snapshot is created because the creation of the copy becomes dissociated from the data of the data object reflecting the current state of the application. Thus, the application can be paused or quiesced while a snapshot of the data object (i.e., the data object reflective of the state of the application) is created, and it can be resumed immediately thereafter without waiting for a checkpoint copy to be created. In the embodiments described herein, the modification of the data object on the memory device can resume while a checkpoint copy of the snapshot of the data object is being made in a different location. After a checkpoint copy is successfully created, or when a snapshot is no longer needed, the memory subsystem can remove it or delete it from the memory device. Some general features of embodiments are provided below with additional details explained with further reference to FIGS. 1A-1B and 2A-2C.

Advantages of the present disclosure include a significant reduction in the idle time during which the application whose state is to be backed up in the checkpoint copy is quiesced. In the various embodiments, the application can resume processing and modification to the data object (representing the state of the application) can resume and continue during the time that the checkpoint copy is made from the snapshot. Therefore, the time that the application remains idle and does not perform computations is also reduced. Embodiments of the present disclosure, through the utilization of the shared byte-addressable memory architecture of CXL enabling the use of advanced memory technologies, such as 3D-stacked memory and high-bandwidth memory (HBM), allow the snapshots to be created in a significantly shorter time than it takes to create a checkpoint copy of the application state. This allows for more efficient use of memory resources and increased memory bandwidth. These technologies provide additional benefits, such as increased capacity and improved power efficiency. Accordingly, because the time for the duration of which the application is paused for the creation of a snapshot can be orders of magnitude shorter than the time the application was paused for the creation of a checkpoint copy (i.e., without snapshotting), the methods and systems of the present disclosure can be applied in situations with significantly lower job stop-time tolerances. Thus, the embodiments of this disclosure reduce application idle time, increase the effective use of compute time, allow data objects reflecting the application state to be modified while a checkpoint copy is made, and enable checkpoint copying of application states for application states that have low stop-time tolerances. These and other features of the embodiments of the present disclosure are described in more detail with reference to FIG. 1.

In some embodiments, the changes can be recorded by using a change log (e.g., by storing either the current/modified states or the previous states of data object parts in the change log). In other embodiments, the memory sub system can create a duplicate copy of the data object (i.e., one data object copy associated with a snapshot and mapped to a consumer's virtual address space and another data object copy subject to direct modification by a producer) on the memory device so that changes can be recorded in one of the copies while the other copy remains unmodified. Additionally, the various embodiments can employ different approaches for handling read requests from a host application depending on whether the read request is received from a consumer or a producer. In embodiments that use a change log, read requests handling can depend on whether the request was received from a consumer or from a producer. Conversely, in embodiments that use a duplicate copy of a data object, the memory sub-system can respond to read requests from a producer and those from a consumer by retrieving the requested data respectively from the different duplicate copies of the data object.

In embodiments that use a change log, the change log can be stored in a different location on the same device or on a different device than the memory object. For example, in some embodiments, changes to parts of the data object can be recorded by replacing the corresponding part of the data object in the physical location (i.e., that was in a previous or original state) on the memory device with the changed part of the data object (i.e., in a new or modified state) and creating an entry in the change log that contains the previous state of the part data object that was modified. Alternatively, in other embodiments changes to parts of the data object can be recorded by creating an entry in the change log that contains the modified part of the data object (i.e., in a new or modified state) while the corresponding part of the data object stored in its physical location remains unchanged (i.e., in a previous or original state). For ease of reference, a change log that contains entries with previous states of parts of a data object can be referred to as a "previous-state log", while a change log that contains entries with current states of parts of a data object can be referred to as a "current-state log" where, for a particular part of a data object, "previous" and "current" states are defined relative to the latest state of that part in the cache of the producer.

Accordingly, in embodiments using a current-state log, the memory sub-system can reference the current-state log when it receives read requests to determine whether changes were made to the requested part of the data object so that it can provide the requested part in a state that is consistent with the requester's (e.g., consumer's or producer's) mapping. Therefore, the memory sub-system can respond to read requests differently depending on whether the read request is received from a consumer or from a producer. Thus, in some of these embodiments, in response to read requests from a producer, the memory sub-system will refer to the current-state log prior to providing the requested data, while, in response to read requests from a consumer, the memory sub-system will forego referring to the current-state log prior to providing the requested data.

Similarly, in embodiments using a previous-state log, the memory sub-system can refer to the previous-state log when it receives read requests to determine whether changes were made to the requested part of the data object so that it can provide the requested part in a state that is consistent with the requester's mapping. While in these embodiments, just as in embodiments that use a current-state log, the memory sub-system can also respond to read requests differently depending on whether the read request is received from a consumer or from a producer, the handling of the requests is reversed. In other words, in embodiments using a previous-state log, responsive to read requests from a producer, the memory sub-system will forego referring to the previous-state log prior to providing the requested data, while, in response to read requests from a consumer, the memory sub-system will refer to the previous-state log prior to providing the requested data.

Accordingly, the memory sub-system can modify parts of the data object on the memory device to create a modified data object (e.g., by storing the modified data object in the location on the memory device where it resided prior to being modified, or in a different location on the memory device). In some embodiments, the memory sub system can create new snapshots by associating the data object (i.e., along with its corresponding physical address ranges) with a new snapshot identifier. Note that, in some embodiments, the creation of a new snapshot need not entail the creation of an entire new duplicate copy of the data object, but rather refers to the association of the data object with a new (i.e., different) snapshot ID identifying the state of the data object at a different point in time than that of a previous snapshot. The memory sub-system can then map the new snapshot identifier of the data object with the physical address ranges containing the modified data object to corresponding virtual address ranges in the virtual address space of a consumer. In some embodiments, the memory sub-system can "erase" a snapshot by removing the association of the snapshot's identifier with the data object and can cause the consumer to un-map the physical memory addresses of that snapshot of the data object from their corresponding virtual memory addresses so that those corresponding virtual memory addresses can be mapped to a new subsequent snapshot of the data object. In some embodiments, even after creating a new snapshot of the data object, the memory system can permit consumers to continue referencing an older (i.e., previous) snapshot. That is, even after the memory sub-system defines a new snapshot, it can retain the old snapshot of the data object (i.e., retain the association between the previous snapshot identifier and the change log entries or the physical memory locations where the parts of the data object are stored in the states consistent with the previous snapshot mapping). Accordingly, since multiple snapshots of a data object can, in some embodiments, be present on the memory device, the memory sub-system can receive requests, from some consumers, referencing an earlier snapshot of the data object while also receiving, from other consumers, requests referencing a later snapshot of the data object.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such devices.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. In other embodiments, the memory sub-system 110 is coupled to multiple host systems 120, 122, 124. FIG. 1A illustrates one example of multiple host systems 120, 122, 124 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host systems 120, 122, and 124 can each include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host systems 120, 122, 124 use the memory sub-system 110, for example, to write data to the memory sub-system 110 and read data from the memory sub-system 110. In some embodiments, each of the host systems 120, 122, and 124 can include processing devices that execute one or more applications or processes (both processes and applications being executed by a host system collectively referred to herein as "host applications"). For example, host system 120 can have host applications/processes 121A-121N being executed on its processing device. Similarly, host systems 122 and 124 can execute host applications/processes 123A-123N and 125A-125N, respectively.

Each of the host systems 120, 122, and 124 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120, 122, 124 and the memory sub-system 110. The host system 120, 122, 124 can further utilize an NVM Express (NVMe) interface to access components (e.g., memory devices 130) when the memory sub-system 110 is coupled with the host system 120, 122, 124 by the physical host interface (e.g., PCIe bus). The physical host interface can provide an interface for passing control, address, data, and other signals between the memory sub-system 110 and the host system 120, 122, 124. FIG. 1A illustrates a memory sub-system 110 as an example. In general, each of the host systems 120, 122, and 124 can access multiple memory sub-systems via a same communication connection, multiple separate communication connections, and/or a combination of communication connections.

In some embodiments, the host system 120, 122, 124 can be coupled to memory subsystem 110 via a compute express link (CXL) interface. In such embodiments, memory sub-system 110 can be a CXL system configured to support CXL protocols. A CXL interface refers to an interface that can support a number of protocols that can run on top of PCIe, including a CXL.io protocol, a CXL.mem protocol, and a CXL.cache protocol. A CXL.io protocol is similar to a PCIe protocol in that can be viewed as an "enhanced" PCIe protocol capable of carving out managed memory. The CXL interface can be used for initialization, link-up, device discovery and enumeration, as well as for register access. The CXL interface can also provide an interface for I/O devices. The CXL.mem protocol can enable host access to the memory of an attached device using memory semantics (e.g., load and store commands). This approach can support both volatile and persistent memory architectures, in accordance with embodiments described herein. The CXL.cache protocol can define host-device interactions to enable efficient caching of host memory with low latency using a request and response approach. Traffic can run through the CXL.io protocol, and the CXL.mem and CXL.cache protocols can share a common link layer and transaction layer. Accordingly, the CXL protocols can be multiplexed and transported via a PCIe physical layer.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of nonvolatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM). Some of the foregoing types of non-volatile memory that can be included in memory device 130, such as the 3D cross-point memory, MRAM, PCM, SSTRAM and others can be referred to herein as storage-class memory (SCM) or persistent memory (PMEM).

In some embodiments, one or more of the memory devices 130, 140 of memory sub-system 110 can be a PMEM device. A persistent memory, in accordance with embodiments provided herein, refers to a memory device or a portion of a memory device (i.e., a persistent memory region) that stores data items such that the data can be accessed even after the end of the process that created or last modified the data items. In some embodiments, the memory device 130, 140 can be a PMEM device that is a non-volatile memory device. In other or similar embodiments, the memory device 130, 140 can be a PMEM device that is a power protected volatile memory device (e.g., a power protected dynamic random-access memory (DRAM) device). In some embodiments, memory sub-system 110 may not include a memory device 130, 140 that is a PMEM device in its entirety and, instead, memory device 130 and/or memory device 140 can include one or more persistent memory regions. A persistent memory region refers to a portion of a memory device that supports persistent memory storage, in accordance with embodiments described herein. For example, in some embodiments, memory device 130 can be a volatile memory device instead of a non-volatile memory device and at least a portion of memory device 140 can be power protected volatile memory.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and one or more host systems 120, 122, 124.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120, 122, 124 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120, 122, 124.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 can include a snapshot management component (SMC) 113 that can receive data and store data on the memory device 130, manage snapshots of the data, and manage accesses to the data by one or more host systems 120, 122, 124 or by other components of the memory sub-system 110 to enable the creation of checkpoint copies of the data. In some embodiments, the memory sub-system controller 115 includes at least a portion of the snapshot management component 113. In some embodiments, the snapshot management component 113 is part of the host system 120, 122, 124, an application, or an operating system. In other embodiments, local media controller 135 includes at least a portion of snapshot management component 113 and is configured to perform the functionality described herein.

In the various embodiments described herein, the snapshot management component 113 can perform a variety of functions related to creating and managing snapshots as well as to creating and managing checkpoint copies of data objects reflective of application states. Broadly speaking, the SMC 113 can receive a data object and can store it on a memory device 130. As described in more detail further, the SMC 113 can store the data of data object at locations on the memory device identified by address ranges that can be associated with the object identifier assigned to the data object. In the several embodiments, the SMC 113 can modify the data of the data object on the memory device 130 as well as stop (e.g., pause) modification and resume it at a later time. Additionally, the SMC 113 can create and remove snapshots of data objects and manage the modification of data objects by host applications on the memory device 130. In some embodiments, the SMC can generate (i.e., register a representation of) a snapshot of the data object at a particular point in time by associating a snapshot identifier with a corresponding set of address ranges containing the data of the data object at that point in time. In several embodiments, the SMC 113 can receive, from host applications, requests to access (e.g., read or write) the data of the data object, and can respond to such requests by performing a sequence of operations that can depend on whether the requesting host application is a producer or a consumer. The SMC 113 can thus make a checkpoint copy of the data object by copying the snapshot (i.e., the data contained in the address ranges associated with that snapshot) to a different location (e.g., another memory device). While making a checkpoint copy of the data object snapshot, the SMC 113 can resume modifying the data object without waiting for the copying of the data object snapshot to be completed (i.e., modification of the data object on the memory device 130 can continue while the snapshot of the data object is being copied to another location). These and other capabilities and functions of the SMC 113 are further explained in more detail as follows.

In some embodiments, the snapshot management component 113 can receive from host system 120, a data object created by a host application/process 121A. The data object can include a data structure that is reflective of a state of the host application/process 121A (e.g., the data object can include information that represents the values of the variables, the memory layout, the position of the instruction pointer, and other details about the state of the application/process). For example, in some embodiments, the SMC 113 can receive, from a producer (e.g., a host application 123A), a data object representative of the state of the host application 123A to store on the memory device 130.

The SMC 113 can store the data object on the memory device 130, which can be a fabric-attached memory device, a byte-addressable memory device, as well as a fabric-attached byte-addressable memory device (e.g., a CXL-based FAM PMEM device). The SMC 113 can write the data of the data object on the memory device 130 and map the one or more physical address ranges identifying respective locations containing storing the data object (also referred to herein as "physical address ranges of the data object" containing data of the data object) on the memory device 130 with corresponding virtual address ranges in the virtual address space available to the producer (i.e., the virtual/logical address space allocated by a host system to the host application that created the data object). For storing the data object on the memory device 130, the SMC can record the data of the data object at respective locations on the memory device 130 identified by a set of corresponding address ranges (e.g., physical address range or extent list of non-contiguous physical address ranges indicating the locations on the memory device 130 of the data object's data).

In some embodiments, the SMC 113 can assign an object identifier to the data object by associating (e.g., in a metadata entry in a data structure) the object identifier with the physical address ranges of the data object on the memory device 130. For example, the SMC can map the physical memory addresses where the data object resides on the memory device 130 (e.g., physical address range or extent list of non-contiguous physical address ranges indicating the locations on the memory device 130 of the data object's data) to corresponding virtual memory addresses of a host application/process 121A, 123A, 125A, in the virtual address space of a host system 120, 122, 124. In this manner, the SMC 113 can register the data object on the memory device, where, for the purposes of this disclosure, the "registering" refers to associating the data object with an object ID and indicating that the data object is subject to snapshotting in a metadata item. Snapshotting, in this context, refers to associating the state of the data object (e.g., the state of the application reflected by the data structure of the data item) at a particular time with a snapshot identifier.

Thus, in some embodiments, the SMC 113 can associate (e.g., in a metadata entry in a data structure) the object identifier with a snapshot identifier to define a snapshot of the data of the data object on the memory device 130. In this manner, a particular snapshot of the data object is reflective of the state of the data of the data object at the time that the snapshot was created (i.e., the time that the identifier of that particular snapshot was assigned to the data object). The snapshot can, therefore, be associated with the state of the data as well as with the locations (i.e., physical address ranges) of the data of the data object on the memory device at the time that the snapshot was created. The physical address ranges identifying respective locations on the memory device 130 storing the data object can be referred to as "the physical address ranges of the snapshot" containing data of the data object for the purposes of this disclosure. Note that while initially the physical address ranges of the snapshot can coincide with the physical address ranges of the data object, the physical address ranges of the data object can subsequently change if the data object is modified. Consequently, the SMC 113 can map the snapshot to a consumer (e.g., another host application 125A) by mapping the physical address ranges of the snapshot to corresponding virtual address ranges in a virtual address space of a consumer (i.e., the virtual/logical address space allocated by a host system to a host application that is permitted to read but not to modify the data object). In some embodiments, the consumer to which the SMC 113 maps (i.e., with whose virtual memory address ranges it associates) the snapshot can be a data mover. The term "data mover" can refer to a process 121N, 123N, 125N (e.g., on the same host 121A, on another host 122A, 124A) or to a direct memory access (DMA) hardware controller (e.g., on the memory device 130 or on the memory sub-system 110).

In some embodiments, the SMC 113 can modify the data object on the memory device 130. For example, the SMC 113 can receive commands from a host system 120A to make changes to the data object (e.g., commands indicating changes to the data structure of the data object that represents the state of application 121A). In response to those commands, the SMC can modify, on the memory device 130, the data of the data object residing at the corresponding set of address ranges (e.g., the set of physical address ranges associated with the data object). The SMC 113 can also modify the address ranges associated with the data object (i.e., update, in a metadata item, the address ranges indicating the locations of the data of the data object on the memory device 130).

In some embodiments, this modification can freely continue for a predetermined period of time or until a triggering event occurs. For example, at the expiration of a predetermined period of time (e.g., on a scheduled recurring basis, at a predetermined checkpoint time) or upon registering a triggering event such as receiving a corresponding command or instruction (e.g., indicating the occurrence of a checkpoint), the SMC 113 can pause modification of the data object on the memory device 130. Accordingly, the SMC 113 can stop the modification of the data object at a particular point in time to create a snapshot of a data object (e.g., to snapshot the state of an application 121A at that point in time). For example, the SMC 113 can temporarily quiesce the application 121A by notifying the host to quiesce the application 121A, by refusing further modification commands, or by delaying or pausing execution of modification commands.

In some embodiments, having created a snapshot of the data object, the SMC 113 can make a checkpoint copy of the data of the data object reflected by the snapshot. For example, the SMC 113 can copy the snapshot (i.e., the data of the data object residing at the address ranges associated with the corresponding snapshot ID) to another location. The SMC 113 can copy the snapshot from the memory device 130 to another location on the same memory device, to another local memory device, a remote device, a non-volatile storage device, etc. For example, the SMC 113 can access the snapshot on the memory device 130 and transmit the data residing in the set of address ranges identified by the snapshot identifier to a remote data storage device (e.g., a non-volatile memory device). In some embodiments, simultaneously with or at a time overlapping in duration with the copying of the snapshot, the SMC 113 can resume modifying the data object on the memory device 130. For example, the SMC 113 can continue receiving or accepting commands from the host 120A or host application 121A to make changes to the data object. The SMC 113 can resume execution of instructions received from the host 120A or host application 121A to make changes to the data object that it previously paused or delayed. Accordingly, in the various embodiments, the SMC 113 can edit the data of the data object residing in the set of address ranges associated with the data object (i.e., the address ranges identifying the locations on the memory device 130 where the data of the data object resides) concurrently with the snapshot being copied to a different location. These mechanisms are described in more detail with reference to FIG. 1B and continued reference to FIG. 1A.

Figure 1B:
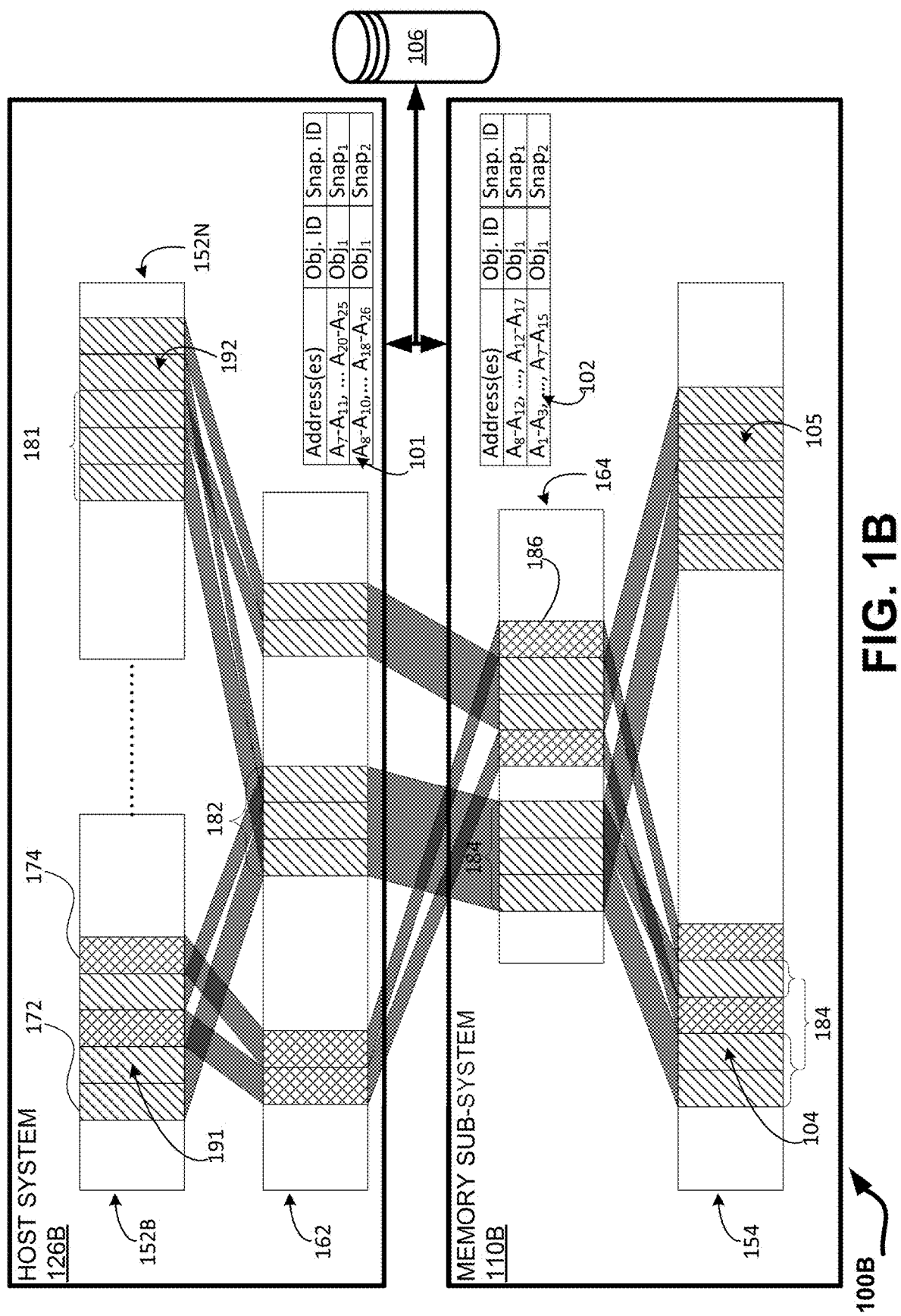
FIG. 1B illustrates an example computing system that includes a data object and a snapshot stored on a memory sub-system in accordance with some embodiments of the present disclosure.

FIG. 1B depicts an example computing system (e.g., host system) 126B that includes a data object 104 and a snapshot 105 stored on a memory sub-system 110B in accordance with some embodiments of the present disclosure. Initially the SMC 113 can receive from a host system 126B a data structure or data object that from a cache or from another location associated with a host application/process 121A virtual (e.g., logical) memory address space 152B. The virtual (e.g., logical) memory address space 152B can be allocated to the host application/process 121A by host system 126B and another virtual (e.g., logical) memory address space 152N can be allocated to another host application/process 121N (e.g., a consumer, a data mover).

In some embodiments, the data object 104 can be made up of multiple portions of data (depicted as shaded rectangles in FIG. 1B) that can physically reside in the device physical memory address space 164 (e.g., the physical media of memory device 130) of the memory sub system 110B. The memory sub-system 110B (e.g., by SMC 113) can associate addresses in the device physical memory address space 164 with addresses in the device virtual (e.g., logical) memory space 154. For example, for a data portion of a data object 104, the memory sub-system 110B (e.g., by SMC 113) can record an entry in a metadata item that includes a range of device physical addresses and an associated corresponding range of device virtual (e.g., logical) addresses. As a logical abstraction, a representation of the data object 104 can be mapped to some addresses within the device virtual memory address space 154. The virtual address ranges respectively containing portions of the data object 104 in the device virtual memory address space 154 can be mapped to (i.e., associated with) corresponding physical address ranges 102 in the memory sub-system's 110B memory device 130 physical memory address space 164. In the various embodiments, the SMC 113 can associate (e.g., in a metadata entry/item) the device physical address ranges 102 in the memory device 130 physical memory address space 164 where the data of the data object 104 resides, with a data object identifier. The SMC 113 can modify the portions of the data object 104 and record portions of the data object 104 in different address ranges of the physical memory address space 164. For example, in the depicted embodiment, the data object 104 can initially be made up of unmodified data portions 184 (mapped to corresponding virtual address ranges), each of which resides in a corresponding address range in the physical memory address space 164. The SMC 113 can then modify some of the portions of the data object 104 and record the modified portions 186 of the data object in different corresponding addresses in the physical memory address space 164. Accordingly, the SMC 113 associates a new set of address ranges 102, which includes both the different address ranges storing the modified data portions 186 as well as the address ranges storing the remaining unmodified data portions 184 with the identifier of the data object 104.

At some time after the creation of the data object, the SMC 113 can create a snapshot 105 of the data object 104 and associate the device physical address ranges storing the (yet unmodified) portions 184 of the data object 104 with corresponding virtual address ranges in virtual memory address space 154 to be associated with the snapshot 105. In the various embodiments, the SMC 113 can associate (e.g., in a metadata entry/item in a data structure) the physical address ranges 102 in the memory device 130 physical memory address space 164, where the data of the snapshot 105 of the data object 104 resides with a snapshot identifier. In some embodiments, the device virtual address ranges where the data of the snapshot 105 of the data object 104 resides can be completely different from device virtual address ranges where the data of the data object 104 resides or can coincide with it (e.g., partially or completely). In this manner, the same data portions (e.g., unmodified data portions 184) identified by their device physical address ranges in device physical address space 164, can be mapped to multiple different corresponding device virtual address ranges in device virtual address space 154. In this manner, SMC 113 can distinguish accesses to a snapshot 105 of a data object from accesses to the data object 104 itself by directing the access requests and commands to different corresponding virtual address ranges and different corresponding physical address ranges determined whether the request or command is coming from a producer or a consumer as described further in more detail below.

In the various embodiments, the SMC 113, the host system 126B, or the memory sub-system 110B can map portions of the device physical memory space 164 (i.e., one or more device physical memory address ranges) to portions of the host physical memory space 162 (i.e., one or more host physical memory address ranges). Analogously to the description with regard to the logical-to-physical (LTP) mappings in the memory device associating the physical address ranges with corresponding virtual address ranges, as a logical abstraction, in the host system 126B a representation of the data object 191 can be mapped to some addresses within the host virtual memory address space 152B allocated to a host application 121A. The host virtual address ranges respectively containing portions of the data object in the host virtual memory address space 152B can be mapped to (i.e., associated with) corresponding host physical address ranges 101 in the host physical memory address space 162 of the host system 126B. In the various embodiments, the SMC 113 can associate the host physical address ranges 101 in the host physical memory address space 162 where the data of the data object resides with a data object identifier. The SMC 113 can modify the portions of the data object and record portions of the data object in different host physical address ranges of the physical memory address space 162. For example, in the depicted embodiment, the data object can initially be made up of unmodified data portions 172, each of which resides in a corresponding physical address range in the host physical memory address space 162. The SMC 113 can then modify some of the portions of the data object and record the modified portions 174 of the data object in different corresponding host physical addresses in the physical memory address space 162. Accordingly, the SMC 113 can associate a new set of host physical address ranges 101, which includes the different address ranges storing the modified data portions 174 as well as the address ranges storing the remaining unmodified data portions 182 with the identifier of the data object.

Similarly to the description above provided from the perspective of memory device 130, in the various embodiments hereof a snapshot 192 of the data object 191 can be created and registered from the perspective of a host system 126B as well. At some time after the creation of the data object 191, the SMC 113 can create a snapshot 192 of the data object 191 and associate the host physical address ranges storing the (yet unmodified) portions 172 of the data object with corresponding host virtual (e.g., logical) address ranges in host virtual (e.g., logical) memory address space 152N allocated to host application/process 121N (e.g., a consumer, a data mover). In the various embodiments, the SMC 113 can associate (e.g., in a metadata entry/item in a data structure) the physical address ranges 101 in the host system 126B physical memory address space 162, where the data of the snapshot 192 of the data object 191 resides with a snapshot identifier. In some embodiments, the host virtual address ranges in host virtual memory address space 152N where the data of the snapshot 192 of the data object 191 resides can be completely different from host virtual address ranges in host virtual memory address space 152B where the data of the data object 191 resides or can coincide with it (e.g., partially or completely). For example, the data of the snapshot 192 can reside in virtual memory address ranges in host virtual memory address space 152N allocated to host application/process 121N (e.g., a consumer, a data mover) while the data of the data object 191 can reside in virtual memory address ranges in host virtual memory address space 152B allocated to host application/process 121A (e.g., a producer) that generated the data object as a representation of the state of application/process 121N. In this manner, the same data portions (e.g., unmodified data portions 182) identified by their host physical address ranges in device physical address space 162, can be mapped to multiple different corresponding host virtual address ranges in device virtual address spaces 152B and 152N. In this manner, SMC 113 can distinguish accesses to a snapshot 192 of a data object from accesses to the data object 191 itself by directing the access requests and commands to different corresponding virtual address ranges and different corresponding physical address ranges determined whether the request or command is coming from a producer or a consumer as described further in more detail below.

In the several embodiments, at the expiration of a predetermined period of time (e.g., on a scheduled recurring basis, at a predetermined checkpoint time) or upon registering a triggering event such as the receipt of a corresponding command or instruction (e.g., indicating the occurrence of a checkpoint), the SMC 113 can pause modification of the data object 104, 191 on the memory device 130 of the memory sub-system 110B. Accordingly, the SMC 113 can stop the modification of the data object 191, 104 at a particular point in time to create a snapshot 105, 192 of a data object (e.g., to snapshot the state of an application 121A at that point in time). For example, the SMC 113 can temporarily quiesce the application 121A by notifying the host system 126B to quiesce the application 121A, by refusing further modification commands, or by delaying or pausing execution of modification commands.

In these and other embodiments, having created a snapshot of the data object, the SMC 113 can make a checkpoint copy of the data of the data object reflected by the snapshot 105, 192. For example, the SMC 113 (e.g., through consumer/data mover 121N) can copy the snapshot 105, 192 (i.e., the data of the data object residing at the address ranges associated with the corresponding snapshot ID) from the memory device 130 to another location on the same memory device, to another local memory device, a remote device, a non-volatile storage device, etc. For example, the SMC 113 can access the snapshot on the memory device 130 and transmit (e.g., through consumer/data mover 121N) the data residing in the set of address ranges identified by the snapshot identifier to a remote data storage device (e.g., a non-volatile memory device) 106. In some embodiments, simultaneously with or at a time overlapping in duration with the copying of the snapshot 105, 192, the SMC 113 can resume modifying the data object 104, 191 on the memory device 130. For example, the SMC 113 can continue receiving or accepting commands from the host 126B or host application 121A to make changes to the data object 104, 191. While copying (e.g., through consumer/data mover 121N) the data of the snapshot 105, 192 of the data object, the SMC 113 can resume execution of instructions received from the host 126B or host application 121A to make changes to the data object that it previously paused or delayed. Accordingly, in the various embodiments, the SMC 113 can edit the data of the data object residing in the set of address ranges (e.g., device physical address ranges) associated with the data object (i.e., the address ranges identifying the locations on the memory device 130 where the data of the data object resides) concurrently with the snapshot being copied to a different location.

For the purposes of this disclosure, the portions of data that form a data object 104, 191 and the portions of data that form a snapshot 105, 192, can be referred to as data items. Accordingly, each data portion 172, 174, 182, 184, 186 can be a data item. In some embodiments, the SMC 113 can maintain, on a memory device 130, a set of data items reflective of a state of a host application 121A. This set of data items can be maintained in a first set of physical address ranges (e.g., on the memory device 130). The set of data items can form a data object 104, 191 having an object identifier associated with it in a metadata entry. In some embodiments, this set of data items can be associated with the object identifier assigned to the first set of physical address ranges.

In the various embodiments, the SMC 113 can receive a request to make a checkpoint copy of the state of the host application. The SMC 113, can receive this request from a host system 120A, 122A or from another component of the memory sub-system 110. In response to receiving this request, the SMC 113 can associate a snapshot identifier with the object identifier by assigning the snapshot identifier to a first set of physical address ranges. In some embodiments, the associations between a set of data objects and a corresponding object identifier, set of memory address ranges, and snapshot identifier can be recorded in corresponding metadata entries in a data structure. The snapshot identifier can identify a snapshot that includes the set of data items. Accordingly, in this manner, these data items become part of the snapshot as indicated by the associated object identifier and associated set of address ranges.

In some embodiments, assigning the snapshot identifier to the first set of physical address ranges can include the SMC 113 disabling the modification of the set of data items at the first set of physical address ranges of memory device 130. Disabling the modification of the data items in this set of physical address ranges can entail blocking subsequent requests to modify the data items from being executed at this first set of physical address ranges or can entail directing these requests to another location. For example, disabling the modification of the set of data items at the first set of physical address ranges can include SMC 113 causing subsequent requests to modify a data item of the set of data items to be executed in the second set of physical address ranges. These requests to modify a data item in this set of data items (i.e., to modify a data portion making up that data object) can be received from either a host system 120A, 122A, 124A, a host application 121A, 123A, 125A, or another component of the memory sub-system 110.

Accordingly, in some embodiments, the SMC 113 can receive a request to modify at least one data item of the set of data items at the first set of physical address ranges of the memory device 130. In some cases, the request to make a checkpoint copy and the request to modify at least one data item can be received from different components. For example, the SMC 113 can receive the request to make a checkpoint copy from host system 120A, host application 121A, or a component of memory sub-system 110 and can receive the request to modify at least one data item from a different host system 122A, different host application 122N, 123A, or a different component of memory sub-system 110.

In some embodiments, these requests to modify a data item at an address in the first set of physical address ranges can be treated differently after the snapshot is associated with this set of physical address ranges (i.e., after the snapshot is registered). For example, the SMC 113 can execute the request (i.e., a request received subsequent to the snapshot being registered and associated with this set of physical address ranges) by recording the requested modification of the data item exclusively at another set of physical address ranges. That is, instead of causing the execution of this subsequently received request to modify one or more data items at the set of physical address ranges (i.e., set of physical address ranges the that has been associated with the snapshot), the SMC 113 can execute the request at a different set of physical address ranges.

In the various embodiments, the SMC 113 can make the checkpoint copy by copying the set of data items of the snapshot from the first set of physical address ranges on the memory device 130 (i.e., the set of physical address ranges associated with the snapshot) to another memory device 106 or to another location on the same memory device 130. The other memory device 106 can be a non-volatile memory device that includes persistent memory. In some embodiments, the SMC 113 can transmit the set of data items of the snapshot to the second memory device through a direct memory access (DMA) controller. In these or other embodiments, the SMC 113 can transmit the set of data items of the snapshot to the second memory device 106 through one or more host applications 121A, 123A, 125A.

After the checkpoint copy is this created the SMC 113 can then begin permitting requested modifications to be executed at that first set of physical address ranges. For example, responsive to making the checkpoint copy, the SMC 113 can enable the modification of the set of data items at the first set of physical address ranges (i.e., re-enable the modification of the data object at the set of physical address ranges that were associated with the snapshot). In some cases, the SMC 113 can stop blocking requests for modifications to be made at that first set of physical address ranges or it can stop redirecting those requests to the other set of physical address ranges. In some of these embodiments, duration of the SMC 113 copying the set of data items of the snapshot 105, 192 to the other memory device 106 can at least partially coincide with the duration of recording the modification. Thus, in this manner, the creation of the checkpoint copy by copying the snapshot to another memory device 106 can at least partially overlap in time with a modification being recorded at the second set of physical address ranges on the memory device 130. Therefore, in some of these embodiments, because the requested modification of a data item of the data object 104, 191 can occur at a different address range then the address ranges that store the snapshot 105, 192, the checkpoint copy can be made from the snapshot at the same time that the data object 104, 191 is being modified at another set of physical address ranges of the memory device 130.

In the various embodiments of this disclosure, the SMC 113 can implement one or more different mechanisms for handling modifications to a data object as well as for handling and responding to request to access (i.e., read/write) the data of the data object. These mechanisms are described in more detail with reference to FIGS. 2A-2C and continued reference to FIG. 1.

Figure 2A:
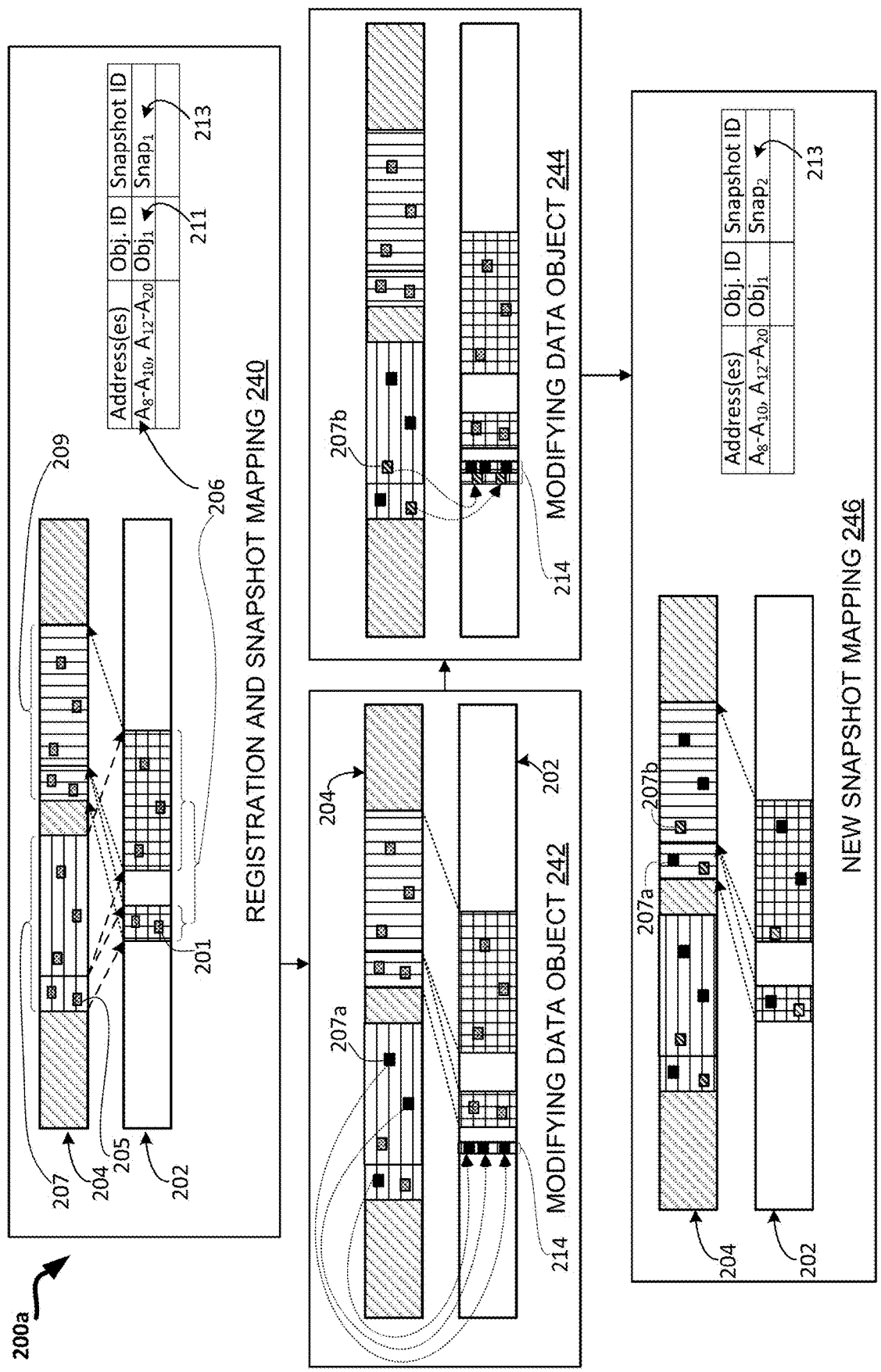
FIG. 2A depicts a sequence of block diagrams illustrating example snapshot management operations with corresponding example states of physical address space and virtual address space in accordance with some embodiments of the present disclosure.
Figure 2B:
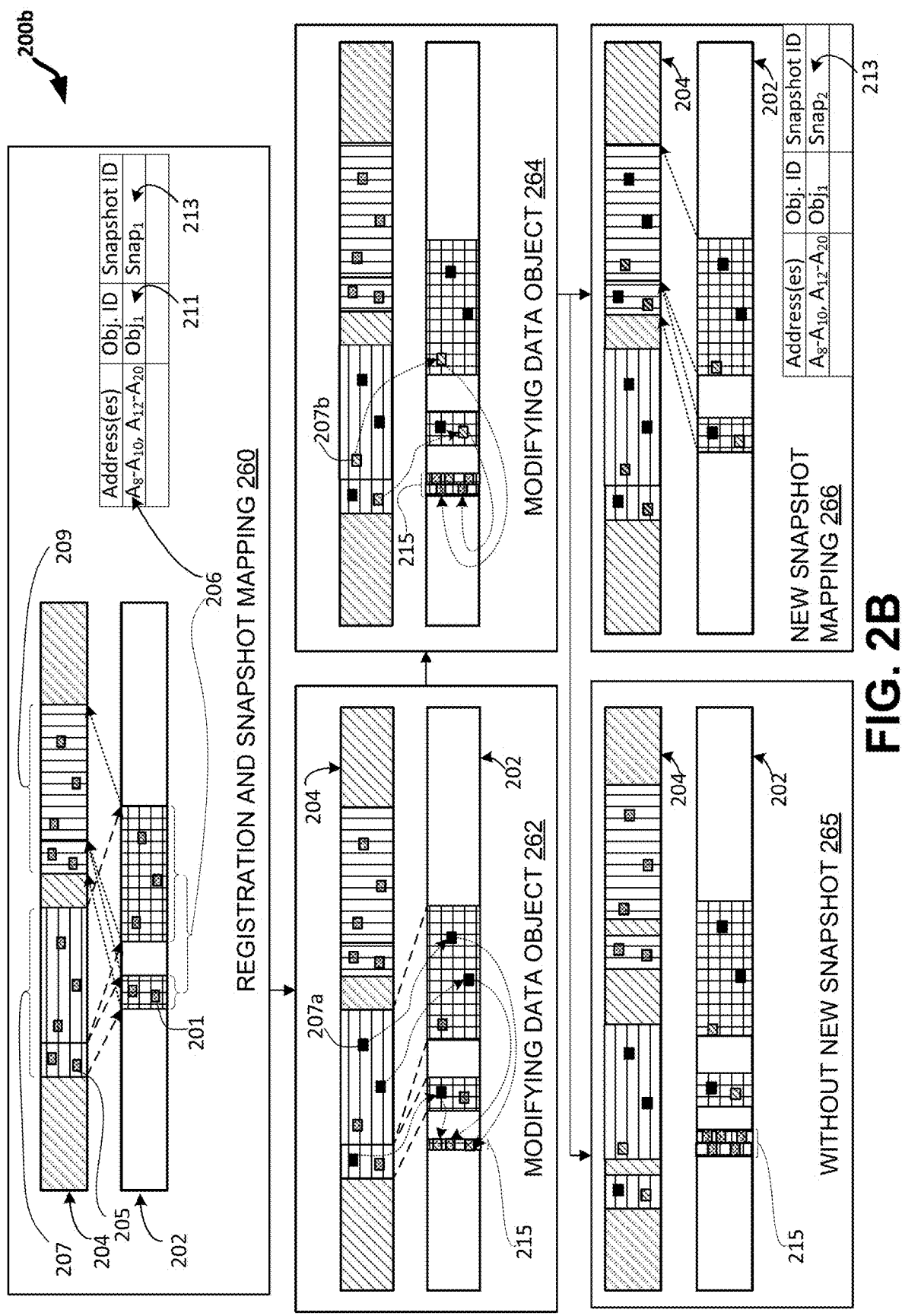
FIG. 2B depicts a sequence of block diagrams illustrating example snapshot management operations with corresponding example states of physical address space and virtual address space in accordance with some embodiments of the present disclosure.

Each of the FIGS. 2A-2C depicts a sequence of block diagrams illustrating example snapshot management operations with corresponding example states of physical address space and virtual address space in accordance with some embodiments of the present disclosure. Furthermore, although in some embodiments, the producer and consumer can each be executed on different respective host systems, all of the FIGS. 2A-2C are illustrative of relationships between a producer, a consumer, and the data object according to embodiments where the consumer and producer are each respectively different host applications 121A, 121N being executed on the same host system 120. Nevertheless, each of the FIGS. 2A-2C are representative of different embodiments, each embodiment implementing a different mechanism for recording changes to the data object. FIGS. 2A-2B illustrate relationships for embodiments that use a change log to record changes made to a data object by a producer, while FIG. 2C illustrates relationships for an embodiment that uses a duplicate copy of the data object to record changes made to the data object by a producer. The operations described with reference to FIGS. 2A-2C can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The operation of SMC 113 and the relationships shown in the first block 240, 260, 280 of the respective sequences of FIGS. 2A-2C can be similar or analogous to each other. For example, in these embodiments, the SMC 113 can store a data object made up of multiple parts 201 on the memory device 130 and map the physical address ranges 206 of the data object within the physical address space 202 on the memory device 130 with corresponding virtual address ranges 207 in the virtual address space 204 available to the producer. In these embodiments, the memory device 130 can be a FAM memory device and, as illustrated by the gap in the depicted physical address space 202 on the memory device 130, the physical address ranges 206 can be not contiguous.

In some embodiments, the SMC 113 can assign an object identifier 211 to the data object by associating the object identifier with corresponding physical address ranges 206. In response to receiving, from the producer, a request to write to the data object, the SMC 113 can record modifications made to a part of the data object on the memory device 130 or on another memory device. As the producer modifies parts 205 of the data object in the producer's cache, the SMC 113 can update or replace parts 201 of the data object on the memory device 130 with the modified parts in the same location (i.e., same physical address range where the part resided previously). Alternatively, as the producer modifies parts 205 of the data object in the producer's cache, the SMC 113 can record the modifications and store the modified parts in a different location while tracking the mapping of the previous location of the part to the different location (e.g., on the memory device 130 or memory sub-system 110) so that the producer's mapping of the data object part (i.e., mapping of the physical addresses corresponding to the data object part's virtual address in the consumer's virtual address space) is continually updated to correspond to the location of the modified part on the memory device.

In some embodiments, the SMC 113 can associate the object identifier 211 with a snapshot identifier 213 to define (i.e., create) a snapshot of the data of the data object on the memory device 130. Consequently, the SMC 113 can map the snapshot to a consumer (e.g., another host application) by mapping the physical address ranges 206 of the snapshot to corresponding virtual address ranges 209 in a virtual address space 204 of a consumer. Accordingly, at this time, parts 201 of the data object located in the physical address space 202 of the memory device 130 are consistent with (i.e., in the same state as) corresponding parts 205 of the data object most recently present in the consumer's cache.

FIG. 2A depicts a sequence 200a of block diagrams illustrating example states of physical address space and virtual address space in accordance with embodiments that use a current-state log to record changes made to a data object. In these embodiments, after a snapshot of the data object is created, a producer (e.g., a producer host application) can make changes (e.g., in its cache) to parts 201 of the data object and, thus, generate modified parts 207a of the data object. Consequently, as shown in block 242, the SMC 113 can record, in a change log associated with the snapshot, entries that are respectively reflective of changes made to the data object by the producer. In some embodiments, the change log can be associated (e.g., in a metadata entry in a data structure) with the snapshot identifier 213 to indicate that the records contained in the change log pertain to modifications relative to the state of the data object corresponding to the snapshot identifier 213. For example, the SMC 113, can record entries in a current-state log 214 that contain the modified parts 207a of the data object. In some embodiments, instead of containing an entire modified part, each of the entries can contain information that represents the difference between the modified part 207a and the previous state of the part 201, 205 of the data object. For a specified data object part that has been modified, this type of information can also be referred to as the "delta information" for that part. Accordingly, in some embodiments, the modified parts 207a or their respective delta information recorded in the entries of the current-state log 214 can be stored in a location on the memory device that is different from the location where the part was stored previously.

In these embodiments, the previous state of the part 201 of the data object (i.e., the previous state of the data object part prior to modification) can, therefore, remain in the physical location(s) (e.g., physical addresses in ranges 206) previously associated with the snapshot of the data object mapped to a consumer's virtual address range(s) 209 in space 204. Accordingly, the change log (i.e., current-state log 214) can contain an entry with a record (e.g., delta information or the entire modified part) representative of the current state of the part 207a of the data object along with a record of the physical location (i.e., physical address) of the corresponding previous state of the part 201 that is consistent with the consumer mapping (i.e., consistent with the state of the data object at the time the snapshot was mapped to the virtual address space of the consumer or at the time a part of the data object was placed in in the consumer's cache). This dissociation of the information reflective of the current state of a modified data object part and the previous state of the data object part allows the SMC 113 to treat access requests differently based on whether the requesting host application is a producer or a consumer. For example, it enables the SMC 113 to respond to consumer requests to read a part of the data object by fetching the data consistent with consumer mapping directly from its physical memory address, while ensuring that the SMC 113 can find and provide data object parts to producers in a consistent state in response to producer requests to read a part of the data object that was modified. Similarly, it enables the SMC 113 to respond to consumer requests to write a part of the data object by rejecting (or simply ignoring) the request, while ensuring that the SMC 113 can record changes made by producers to a data object part, in response to producer requests to write (e.g., modify) the part of the data object.

In these embodiments, if the SMC 113 subsequently receives a read request (i.e., a request to access a part of the memory object) from a producer, the SMC 113 can perform the following sequence of operations to locate and transmit the requested part to the producer. The SMC 113 can first reference the change log, to determine if the requested part of the data object has been modified by the producer, before attempting to retrieve the requested part from its previous physical location on the memory device. For example, if the requested part was modified, the SMC 113 can find the corresponding entry (i.e., the entry with the current state of the requested part and with the corresponding location where the part resides in its previous state) in the current-state log 214. In this case, the SMC 113 can determine that the requested part has been modified and can obtain the requested part of the data object in its current state from the current-state log 214. The SMC 113 can then provide to the producer the requested part of the data object from the change log by combining information from the change log with the data object part in its previous state in its physical location on the memory device 130. On the other hand, if upon referencing the change log, the SMC 113 fails to find an entry corresponding to the requested part of the data, then an inference can be made that the requested part of the data is unmodified and still present in its previous state in its corresponding physical location on the memory device 130. Consequently, the SMC 113 can determine that the requested part has not been modified and can then retrieve the requested part of the data object from its physical location on the memory device 130 and provide it to the producer. In contrast, if, in these embodiments, the SMC 113 subsequently receives a read request (i.e., a request to access a part of the memory object) from a consumer, the SMC 113 can retrieve the requested part from its previous physical location on the memory device without referencing the change-log (i.e., current-state log 214). To provide a consistent state of the data object to the consumer, the SMC 113 can then provide to the consumer the requested part of the data object from its physical location on the memory device 130 without regard to whether or not the data object was modified (i.e., without combining information from the change log with the data object part in its previous state).

Furthermore, if additional modifications are made to parts of the data object, as shown in block 244, the SMC 113 can continue to record additional entries respectively reflective of the additional changes made to the data object by the producer. For example, the SMC 113, can record entries in the current-state log 214 that contain additional modified parts 207b of the data object. In some embodiments, each of the entries can contain information reflective of the difference between the modified part 207b and the previous state of the part 201, 205 of the data object. Similarly, in some embodiments, the modified parts 207b or their respective delta information recorded in the entries of the current-state log 214 can be stored in a location on the memory device that is different from the location where the part was stored previously.

Accordingly, in embodiments using a current-state log, the SMC 113 can respond to read requests differently depending on whether the read request is received from a consumer or from a producer. In other words, if a change was made, the SMC 113 can find a corresponding entry in the current-state log 214, and if a change was not made, the memory sub-system can fail to find a corresponding entry in the current-state log 214. Having found the corresponding entry in the current-state log 214 after the SMC 113 received the read request from a producer, the SMC 113 can provide the current state of the requested part 207b of the data object from the log 214 to the producer. For example, in some embodiments the SMC 113 can retrieve the requested part 207b in its current state from the current-state log 214. In other embodiments, the SMC 113 can combine the delta information of the requested part from the current-state log 214 with the previous state of the part still remaining stored in its previous location on the memory device to generate the current state of the requested part and provide it to the producer. On the other hand, having failed to find the corresponding entry in the current-state log 214 after the SMC 113 received the read request from a producer, the SMC 113 can retrieve the requested part 201 from its corresponding physical location (i.e., from the physical address range(s) of the data object or the physical address range(s) of the last snapshot) on the memory device and transmit it to the producer (since the state of the requested data object has not been changed). Furthermore, in these embodiments, if the SMC 113 receives the read request from a consumer, regardless of whether a change was made, the SMC 113 can retrieve the requested part 201 from its corresponding physical location (i.e., from the physical address range(s) of the snapshot) on the memory device 130 and transmit it to the consumer in response to the request. In this manner, access requests from a consumer/data mover can be differentiated from access requests from a producer and enable copying of the data of the snapshot by the consumer/data mover to take place without interfering with requests from a producer.

In some of these embodiments, upon receiving from a host application a write request associated with the data object, the SMC 113 can determine whether or not to accept the request. For example, if the requesting host application is a consumer, the SMC 113 can determine to not accept the request (e.g., ignore the request or respond with a rejection of the request). In such cases, the SMC 113 can send, to the consumer, a notification with an indication that the consumer that the write request will not be satisfied. Conversely, if the requesting host application is a producer, the SMC 113 can determine to accept the request and write the data of the request in memory device 130 by recording the changes/modification to parts of the data object as described above. Accordingly, in some embodiments consumers are not permitted to perform write operations. In this manner, write requests from a producer can continue or resume after a snapshot is created and while copying of the data of the snapshot by the consumer/data mover is ongoing without interfering with requests from a producer or allowing modifications to the data object by the consumer/data mover.

Additionally, in these embodiments, the SMC 113 can create a subsequent snapshot of the data object by modifying the data object using the changes reflected by entries recorded in a change log, and then associating the object identifier with a different snapshot identifier 213 to define the subsequent snapshot of the object on the memory device 130, as shown in block 246. In this manner, the subsequent snapshot of the data object can be reflective of the state of the data of the data object at the time that the subsequent snapshot was created (i.e., the time that the identifier of the subsequent snapshot was assigned to the data object). The subsequent snapshot can, therefore, be associated with the current state of the data as well as with the locations (i.e., physical address ranges) of the data of the data object on the memory device at the time that the snapshot was created. For example, in embodiments where the current-state log 214 contains a modified part of the data object, the SMC 113 can replace the corresponding part of the data object located in the location consistent with the previous snapshot mapping with the modified part from the current state log 214. Similarly, in embodiments where the current-state log 214 contains delta information for a part of the data object, the SMC 113 can edit the corresponding part of the data object, located in the location consistent the previous snapshot mapping, with the modifications represented by the delta information from the current-state log 214.

In some cases, the modification of a part of a data object can cause it to become larger and require more space for the SMC 113 to store it on the memory device than the part required in a previous state. In other cases, the SMC 113 can store modified parts of the data object in a different location on the memory device than the location where the part was stored in its previous state. Accordingly, in these embodiments, creating a subsequent snapshot of the data object can include the SMC 113 modifying the one or more physical address ranges associated with the object identifier to generate one more modified physical address ranges (e.g., in a metadata entry in a data structure) so that the subsequent snapshot can be mapped to one or more consumers. These modified physical address ranges identifying respective locations containing data of the subsequent snapshot of the data object can be referred to as "the physical address ranges of the subsequent snapshot". Accordingly, the SMC 113 can map the physical address ranges of the subsequent snapshot to corresponding virtual address ranges of the consumer and can replace a data part in a previous state in the processor cache of the consumer with the modified data part 207*a*, 207*b* (i.e., the data part in its current state). In other embodiments, the modification of the data objects and the treatment of read requests from consumers and producers can be reversed as explained in more detail with reference to FIG. 2B.

FIG. 2B depicts a sequence 200*b* of block diagrams illustrating example states of physical address space and virtual address space in accordance with embodiments that use a previous-state log to record changes made to a data object. In these embodiments, after a snapshot of the data object is created, a producer (e.g., a producer host application) can make changes (e.g., in its cache) to parts 201 of the data object and, thus, generate modified parts 207*a* of the data object. Consequently, as shown in block 262, the SMC 113 can record, in a change log associated with the snapshot, entries that are respectively reflective of the previous states of the parts 201 of the data object (i.e., the previous state of the data object part prior to modification) obtained from the physical location(s) (e.g., physical addresses in ranges 206) previously associated with the snapshot of the data object mapped to a consumer's virtual address range(s) 209 in space 204. The presence, in the change log, of information relating to a previous state of a part of the data object can be reflective or indicative of a modification having been made to the part by the producer. In some embodiments, the change log can be associated (e.g., in a metadata entry in a data structure) with the snapshot identifier 213 to indicate that the records contained in the change log pertain to the previous state of the data object corresponding to the snapshot identifier 213. For example, the SMC 113, can record entries in a previous-state log 215 that contain the parts 201, 205 of the data object in their previous state (i.e., the state prior to the latest modification of those parts by the producer). In some embodiments, instead of containing an entire part of the data object, each of the entries can contain information that represents the difference between the previous state of the part 201, 205 of the data object and the modified part 207*a* data object. For a specified data object part that has been modified, this type of information can also be referred to as the "delta information" for that part. Accordingly, in some embodiments, the parts 201, 205 in their previous state or their respective delta information recorded in the entries of the previous-state log 215 can be stored in a location on the memory device that is different from the location where the part was stored previously.

In these embodiments, the modified parts 207*a* (i.e., the current state of the parts 201, 205) of the data object representative of changes made to the data object by the producer can, therefore, be stored by SMC 113 in the physical location(s) (e.g., physical addresses in ranges 206) previously associated with the snapshot of the data object mapped to a consumer's virtual address range(s) 209 in space 204. Accordingly, the change log (i.e., previous-state log 215) can contain an entry with a record (e.g., delta information or the entire part 201, 205 in its previous state) representative of the previous state of the part 201, 205 of the data object along with a record of the previous physical location (i.e., physical address) of the part 201 that was consistent with the consumer mapping (i.e., consistent with the state of the data object at the time the snapshot was mapped to the virtual address space of the consumer or at the time a part of the data object was placed in in the consumer's cache). As in other embodiments, this dissociation of the information reflective of the current state of a modified data object part and the previous state of the data object part allows the SMC 113 to treat access requests differently based on whether the requesting host application is a producer or a consumer. For example, it enables the SMC 113 to respond to producer requests to read a part of the data object by fetching the data consistent with producer mapping directly from its physical memory address, while ensuring that the SMC 113 can find and provide data object parts to consumers in a consistent state in response to consumer requests to read a part of the data object that was modified by the producer after the last snapshot was mapped to the consumer. Similarly, it enables the SMC 113 to respond to consumer requests to write a part of the data object by rejecting (or simply ignoring) the request, while ensuring that the SMC 113 can record changes made by producers to a data object part, in response to producer requests to write (e.g., modify) the part of the data object.

In these embodiments, if the SMC 113 subsequently receives a read request (i.e., a request to access a part of the memory object) from a consumer, the SMC 113 can perform the following sequence of operations to locate and transmit the requested part to the consumer. The SMC 113 can first reference the change log, to determine if the requested part of the data object has been modified by the producer, before attempting to retrieve the requested part from its previous physical location on the memory device. For example, if the requested part was modified, the SMC 113 can find the corresponding entry (i.e., the entry with the requested part in its previous state and with the corresponding location where the part previously resided in its previous state and currently resides in its current state on the memory device 130) in the previous-state log 215. In this case, by finding the entry, the SMC 113 can determine that the requested part has been modified and can obtain the requested part of the data object in its previous state from the previous-state log 215. The SMC 113 can then provide to the consumer the requested part of the data object from the change log without retrieving it from its previous physical location on the memory device 130 (i.e., the physical location where the part now resides in its current state). On the other hand, if upon referencing the change log, the SMC 113 fails to find an entry corresponding to the requested part of the data, then an inference can be made that the requested part of the data is unmodified and still present in its previous state in its corresponding physical location on the memory device 130. Consequently, the SMC 113 can determine that the requested part has not been modified and can then retrieve the requested part of the data object from its physical location on the memory device 130 and provide it to the consumer. In contrast, if, in these embodiments, the SMC 113 subsequently receives a read request (i.e., a request to access a part of the memory object) from a producer, the SMC 113 can retrieve the requested part from its previous physical location on the memory device without referencing the change-log (i.e., previous-state log 215). To provide a consistent state of the data object to the producer, the SMC 113 can provide to the producer the requested part of the data object from its physical location on the memory device 130 because the modified data of the data object replaced the unmodified data in its previous location (i.e., the current state of the data object can be accessed at its previous location without combining information from the change log with the data object part in its current state).

Furthermore, if additional modifications are made to parts of the data object, as shown in block 264, the SMC 113 can continue to record additional entries respectively reflective of the states of data object parts prior to the additional changes being made to the data object by the producer. For example, the SMC 113, can record entries in the previous-state log 215 that contain the previous state of the parts 201, 205 of the data object, or entries that contain delta information for the part 201, 205 data object. Similarly, in some embodiments, the parts 201, 205 in their previous state or their respective delta information recorded in the entries of the previous-state log 215 can be stored in a location on the memory device that is different than the location where the part was stored previously.

Accordingly, in embodiments using a previous-state log, the SMC 113 can respond to read requests differently depending on whether the read request is received from a consumer or from a producer. In other words, if a change was made, the SMC 113 can find a corresponding entry in the previous-state log 215, and if a change was not made, the memory sub-system can fail to find a corresponding entry in the previous-state log 215. Having found the corresponding entry in the previous-state log 215 after the SMC 113 received the read request from a consumer, the SMC 113 can provide the previous state of the requested part 201, 205 of the data object from the log 215 to the consumer. For example, in some embodiments the SMC 113 can retrieve the requested part 201, 205 in its previous state from the previous-state log 215. In other embodiments, the SMC 113 can combine the delta information of the requested part from the previous-state log with the current state of the part stored in its location on the memory device to generate the previous state of the requested part and provide it to the consumer. On the other hand, having failed to find the corresponding entry in the previous-state log 215 after the SMC 113 received the read request from a consumer, the SMC 113 can retrieve the requested part 201, 205 from its corresponding physical location (i.e., from the physical address range(s) of the data object or the physical address range(s) of the last snapshot) on the memory device and transmit it to the consumer (since the state of the requested data object has not been changed). Furthermore, in these embodiments, if the SMC 113 receives the read request from a producer, regardless of whether a change was made, the SMC 113 can retrieve the requested part 201, 205 from its corresponding physical location (i.e., from the physical address range(s) of the data object) on the memory device 130 and transmit it to the producer in response to the request. In this manner, access requests from a consumer/data mover can be differentiated from access requests from a producer and enable copying of the data of the snapshot by the consumer/data mover to take place without interfering with requests from a producer.

In some of these embodiments, upon receiving from a host application a write request associated with the data object, the SMC 113 can determine whether to accept the request or not. For example, if the request is received from a consumer host application, the SMC 113 can determine to not accept the request (e.g., ignore the request or respond with a rejection of the request). In such cases, the SMC 113 can respond by sending, to the consumer host application, a notification indicating that the consumer's write request is not allowed. Conversely, if the request is received from a producer host application, the SMC 113 can determine to accept the request and write the data of the request in memory device 130 to the memory device 130 by recording the changes/modification to parts of the data object as described above. Accordingly, in some embodiments consumers are not permitted to perform write operations. In this manner, write requests from a producer can continue or resume after a snapshot is created and while copying of the data of the snapshot by the consumer/data mover is ongoing without interfering with requests from a producer or allowing modifications to the data object by the consumer/data mover.

Additionally, in these embodiments, the SMC 113 can create a subsequent snapshot of the data object by modifying the data object and then associating the object identifier with a different snapshot identifier 213 to define the subsequent snapshot of the object on the memory device 130, as shown in block 266. In this manner, the subsequent snapshot of the data object can be reflective of the state of the data of the data object at the time that the subsequent snapshot was created (i.e., the time that the identifier of the subsequent snapshot was assigned to the data object). The subsequent snapshot can, therefore, be associated with the current state of the data as well as with the locations (i.e., physical address ranges) of the data of the data object on the memory device at the time that the snapshot was created.

In some cases, the modification of a part of a data object can cause it to become larger and require more space for the SMC 113 to store it on the memory device than the part required in a previous state. In other cases, the SMC 113 can store modified parts of the data object in a different location on the memory device than the location where the part was stored in its previous state. Accordingly, in these embodiments, creating a subsequent snapshot of the data object can also include the SMC 113 modifying the one or more physical address ranges associated with the object identifier to generate one more modified physical address ranges (e.g., in a metadata entry in a data structure) so that the subsequent snapshot can be mapped to one or more consumers. Accordingly, the SMC 113 can map the physical address ranges of the subsequent snapshot to corresponding virtual address ranges of the consumer and can replace a data part in a previous state in the processor cache of the consumer with the modified data part 207a, 207b (i.e., the data part in its current state). In other embodiments, the modification of the data objects and the treatment of read requests from consumers and producers can be mirrored relative to two copies of the data object stored on the memory device 130 as explained in more detail with reference to FIG. 2C.

FIG. 2C depicts a sequence 200c of block diagrams illustrating example states of physical address space and virtual address space in accordance with embodiments that use a duplicate copy of the data object to record changes made to a data object. In these embodiments, after a snapshot of the data object is created, a producer (e.g., a producer host application) can also make changes (e.g., in its cache) to parts 201 of the data object and, thus, generate modified parts 207a of the data object. As shown in block 282, the SMC 113 can create a duplicate copy of the original data object on the memory device 130 and map the physical address ranges 206b of the duplicate copy of the data object with corresponding virtual address ranges in the virtual address space available to the producer that were previously mapped to the physical address ranges of the snapshot of the data object. Consequently, as shown in blocks 282 and 284, the SMC 113 can replace parts 201, 205 of the data object in their previous states in the copy of the data object with modified parts 207a and 207b of the data objects (i.e., data object parts in their current states)

In these embodiments, the modified parts 207a (i.e., the current state of the parts 201, 205) of the data object representative of changes made to the data object by the producer can, therefore, be stored by SMC 113 in the physical location(s) (e.g., physical addresses in ranges 206b) of the duplicate copy of the data object. In contrast, the parts 201, 205 of the data object in their previous state can remain stored in the physical address ranges of the snapshot of the data object mapped to a consumer's virtual address range(s) 209 in space 204. As in other embodiments, this dissociation of the information reflective of the current state of a modified data object part and the previous state of the data object part allows the SMC 113 to treat read requests differently based on whether the requesting host application is a producer or a consumer. For example, it enables the SMC 113 to respond to producer requests to read a part of the data object by fetching the data consistent with producer mapping directly from the physical address range(s) 206b of the copy of the data object, and also enables SMC 113 to respond to consumer requests to read a part of the data object by fetching the data consistent with consumer mapping directly from the physical address range(s) 206a of the snapshot of the data object. Similarly, it enables the SMC 113 to respond to consumer requests to write a part of the data object by rejecting (or ignoring) the request, while ensuring that the SMC 113 can record changes made by producers to a data object part, in response to producer requests to write (e.g., modify) the part of the data object.

In these embodiments, if the SMC 113 receives the read request from a consumer or a producer, each request will be treated analogously relative to the physical address range mapped to the requester's virtual address space. For example, if the SMC 113 receives the read request from a consumer and regardless of whether a change was made, the SMC 113 can retrieve the requested part 201, 205 from its corresponding physical location (i.e., from the physical address range(s) of the snapshot) on the memory device 130 and transmit it to the consumer in response to the request. Similarly, if the SMC 113 receives the read request from a producer and regardless of whether a change was made, the SMC 113 can retrieve the requested part 201, 205 from its corresponding physical location (i.e., from the physical address range(s) of the copy of the data object) on the memory device 130 and transmit it to the consumer in response to the request. In this manner, access requests from a consumer/data mover can be differentiated from access requests from a producer and enable copying of the data of the snapshot by the consumer/data mover to take place without interfering with requests from a producer.

In some of these embodiments, upon receiving from a host application a write request associated with the data object, the SMC 113 can determine whether to accept the request or not. For example, if the request is received from a consumer host application, the SMC 113 can determine to not accept the request (e.g., ignore the request or respond with a rejection of the request). In such cases, the SMC 113 can respond by transmitting, to the consumer host application, a notification indicating that the write request is not accepted or that it is not permitted. Conversely, if the request is received from a producer host application, the SMC 113 can determine to accept the request and write the data of the request in memory device 130 to the memory device 130 by recording the changes/modification to parts of the data object as described above. Accordingly, in some embodiments consumers are not permitted to perform write operations. In this manner, write requests from a producer can continue or resume after a snapshot is created and while copying of the data of the snapshot by the consumer/data mover is ongoing without interfering with requests from a producer or allowing modifications to the data object by the consumer/data mover.

Additionally, in these embodiments, the SMC 113 can create a subsequent snapshot of the data object by associating the object identifier with the physical address range(s) of the copy of the data object and also associating it with a different snapshot identifier 213 to define the subsequent snapshot of the object on the memory device 130, as shown in block 286. In this manner, the subsequent snapshot of the data object can be reflective of the state of the data of the data object at the time that the subsequent snapshot was created (i.e., the time that the identifier of the subsequent snapshot was assigned to the data object). The subsequent snapshot can, therefore, be associated with the current state of the data as well as with the locations (i.e., physical address ranges) of the data of the copy of the data object on the memory device that was modified prior to the time that the snapshot was created. Accordingly, the SMC 113 can map the physical address ranges of the subsequent snapshot to corresponding virtual address ranges of the consumer and can replace a data part in a previous state in the processor cache of the consumer with the modified data part 207a, 207b (i.e., the data part in its current state).

Figure 3:
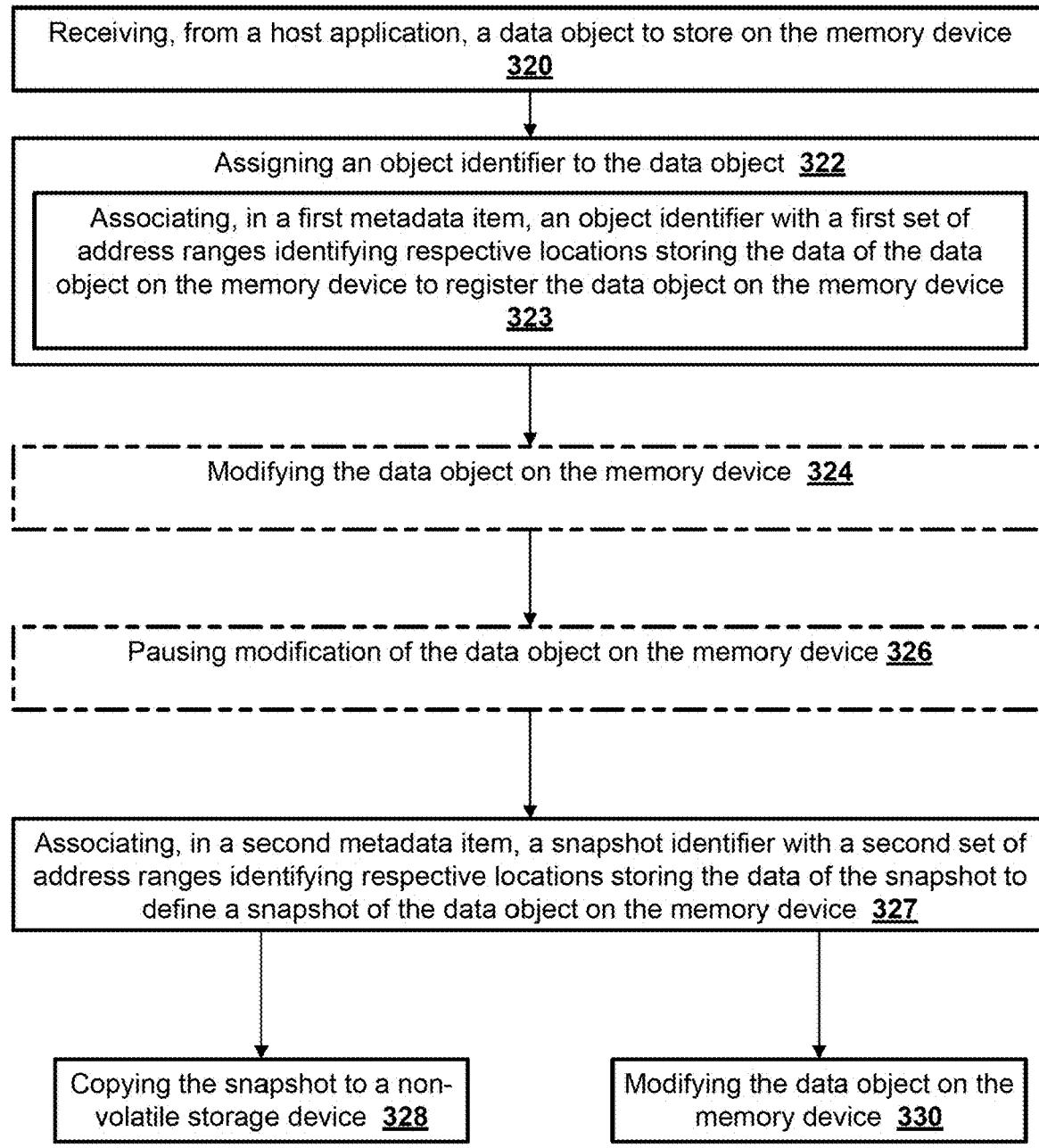
FIG. 3 is a flow diagram of an example method for making checkpoint copies of program states using snapshots on memory devices in accordance with some embodiments of the present disclosure.

FIG. 3 is a flow diagram of an example method 300 for making checkpoint copies of program states using snapshots on memory devices in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the snapshot management component (SMC) 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments of the present disclosure, at operation 320, the processing logic can receive, from a host application (e.g., a producer) a data object to store on the memory device (e.g., memory device 130 of FIG. 1). The data object can include a data structure reflective of the state of the host application. At operation 322, the processing logic can assign an object identifier to the data object. Assigning the object identifier can include the processing logic, at operation 323, associating (e.g., in a metadata item in a data structure) the object identifier with one or more physical address ranges (e.g., non-contiguous physical address extent-lists) identifying respective locations containing data of the data object on the memory device to register the data object on the memory device and to indicate that the data object is subject to snapshotting. As used herein, a metadata item can refer to a metadata entry or a data element (e.g., an entry in a table) containing metadata in a data structure. The processing logic, at operation 323, can also map these physical address ranges to corresponding virtual address ranges within the virtual address space available to the producer (i.e., by making corresponding entries indicating the association of the respective address ranges in a metadata entry).

As producer processes data and the host application (i.e., producer application) state changes, the processing logic can, at operation 324, record the changes of the host application state as changes in the data structure of the data object by modifying the data object on the memory device. The embodiments described herein can have different ways of handling modifications or changes that a producer makes to the data object as described earlier with reference to FIGS. 2A-2C. At operation 326, the processing logic can pause or quiesce the processing performed by the producer (e.g., the processing of an application) along with pausing the modification of the data object to create a snapshot of the data object on the memory device.

In some embodiments, the processing logic can, at operation 327, associate (e.g., in the same or different metadata item in the same or different data structure) the object identifier with a snapshot identifier to define a snapshot of the data of the data object on the memory device. For example, at operation 327, the processing logic can associate a snapshot identifier with another set of one or more address ranges that identify respective locations storing the data of the snapshot and can associate the object (e.g., by reference to its object identifier) with the snapshot identifier. Furthermore, at operation 328, in some embodiments the processing logic can map the physical address ranges to corresponding virtual address ranges in a virtual address space of the memory device or of another host application (e.g., a consumer/data mover). The defined snapshot can thus be associated, by the processing logic at operation 327, with some or all of the physical address ranges in which the processing logic registered the data object on the memory device at operation 322 with the data object identifier. Note that, in some embodiments, the creation of the snapshot need not entail the creation of a duplicate copy of the data object, but rather refers to the association of a data object with a snapshot ID identifying the state of the data object at a particular point in time. Accordingly, by associating the snapshot identifier with the object identifier, the processing logic, at operation 327, consequently associates the snapshot identifier with the aforementioned corresponding physical address ranges. Thus, since the physical address ranges are now associated with the snapshot, the processing logic can "map the snapshot to a consumer" by mapping the physical address ranges with corresponding virtual address ranges in a virtual address space available to a consumer. This mapping can be referred to as "consumer mapping" for the purposes of this disclosure.

As noted earlier, producers can make changes to parts of data objects present in the producer's cache and then store those changes by the processing logic updating, at operation 324, the data object (e.g., by updating the modified parts of the data object) on the memory device accordingly (i.e., flush the cache to the memory device).

In some of these embodiments, the processing logic can receive requests to access (i.e., read/write) parts of the data object from a host application or another process or device (e.g., consumers or producers) and respond differently in each case. For example, upon receiving. From a host application or another process or device. a write request associated with the data object, the processing logic can determine whether to accept the request or not based on whether the request was sent by a consumer or by a producer. For example, if the request is received from a consumer, the processing logic can determine to not accept the request (e.g., ignore the request or respond with a rejection of the request). Conversely, if the request is received from a producer, the processing logic can determine to accept the request. Therefore, in some embodiments, in response to receiving from the producer, a request to write to the data object, the processing logic can record modifications made to a part of the data object on the memory device in a change log associated with the snapshot, as entries that are respectively associated with corresponding changes made to the data object by the producer. The entries can include modified parts of the data object in some embodiments, while in other embodiments the entries can each include delta information for particular parts of the data object.

In some embodiments, the processing logic can receive read requests either from consumers or producers. In response to determining that the request to read a part of the data object was received from a producer, the processing logic can retrieve the requested part by referencing the change log prior to accessing the one or more physical address ranges or retrieve the requested part by retrieving the requested part from the one or more physical address ranges without referencing the change log.

In the various embodiments, having created the snapshot at operation 327, the processing logic can create, at operation 328, a checkpoint copy of the host application from the snapshot of the data object. For example, the processing logic can, at operation 328, copy the snapshot (i.e., the data of the snapshot of the data object contained in its corresponding set of address ranges) to another location (e.g., a non-volatile storage device). Thus, once a snapshot of the data object is created by the processing logic at operation 328, the processing logic can resume, at operation 330, the modification of the data object on the memory device, and the changes to the data object made by the host application can continue to be recorded. Therefore, the host application (i.e., its constituent programs) can be resumed at operation 330 while the data of the snapshot of the data object is copied by the processing logic at operation 328.

Thus, while the application can be paused or quiesced at operation 326, for the processing logic to create, at operation 327, the snapshot of the data object (i.e., the data object reflective of the state of the application), the processing of the application can be resumed by the processing logic at operation 330, immediately thereafter without waiting for a checkpoint copy to be completely created at operation 328. Thus, in the various embodiments, the modification of the data object on the memory device can resume, at operation 330, while the processing logic makes, at operation 328, a checkpoint copy of the snapshot of the data object in a different location. After a checkpoint copy is successfully created, or when a snapshot is no longer needed, the processing logic can remove it or delete it from the memory device.

Figure 4:
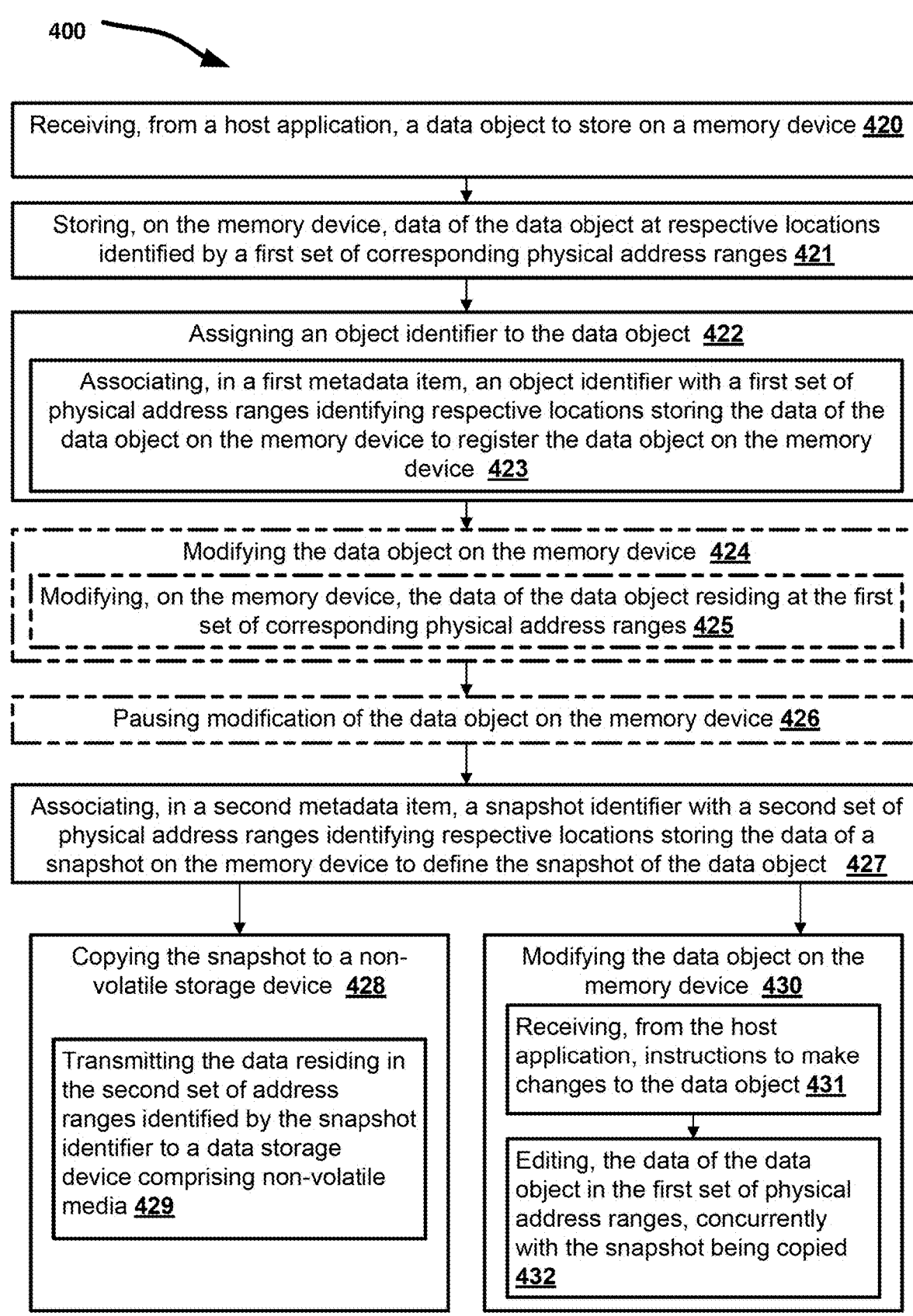
FIG. 4 is a flow diagram of an example method for making checkpoint copies of program states using snapshots on memory devices in accordance with some embodiments of the present disclosure.

FIG. 4 is a flow diagram of an example method 400 for managing read requests relating to modified data objects on memory devices in accordance with some embodiments of the present disclosure from the perspective of a memory device. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the snapshot management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In several embodiments described herein, one or more operations of example method 400 can be performed together with or instead of one or more operations of example method 300.

In some embodiments, at operation 420, the processing logic can receive a data object to store on a memory device from a host system that has been created by a host application or process. This data object can contain a data structure that represents the current state of the host application or process, and can include information about the values of variables, the memory layout, the position of the instruction pointer, and other relevant details. For example, at operation 420, the processing logic can, receive from a host system a data object from a cache or from another location that is associated with a host application/process's virtual memory address space allocated to it by the host application/process by the host system. For instance, the processing logic can receive a data object from a host application that is a producer, where the data object serves as a representation of the state of the host application. Another virtual (e.g., logical) memory address space can be allocated to another host application/process (e.g., a consumer, a data mover).

In certain embodiments, the data object can be composed of multiple portions of data that physically reside in the device physical memory address space of a memory device (e.g., memory device 130 of FIG. 1). As a logical abstraction, a representation of the data object can be mapped to some addresses within the device virtual memory address space. The processing logic can then, at operation 421, store the data object on a memory device, which could be a fabric-attached memory device, a byte-addressable memory device, or a fabric-attached byte-addressable memory device, such as a CXL-based FAM PMEM device. The processing logic can, at operation 421, write the data of the data object to the memory device and create a mapping between one or more physical address ranges, which identify the locations containing the data object, and corresponding virtual address ranges in the virtual address space that is available to the producer. The mapping between the physical and virtual memory addresses is achieved by recording, by the processing logic at operation 421, the data of the data object at the respective locations on the memory device that are identified by a set of corresponding address ranges.

In some embodiments, at operation 422, the processing logic can assign an object identifier to the data object by associating the object identifier with the physical address ranges of the data object on the memory device. This can be done by mapping the physical memory addresses where the data object resides on the memory device to the corresponding virtual memory addresses of a host application in the virtual address space of a host system. The processing logic can associate, at operation 423, addresses in the device physical memory address space with addresses in the device virtual (e.g., logical) memory space. For example, for a portion of a data object, the processing logic can record an entry in a metadata item that includes a range of device physical addresses and an associated corresponding range of device virtual (e.g., logical) addresses. The virtual address ranges containing portions of the data object in the device virtual memory address space can be mapped to (i.e., associated with) corresponding physical address ranges in the memory sub-system's memory device physical memory address space.

In the various embodiments, the processing logic can thus associate, at operation 423, the device physical address ranges in the memory device physical memory address space where the data of the data object resides with a data object identifier. Furthermore, at operation 423, the processing logic can associate the object identifier with a set of physical address ranges identifying respective locations storing the data of the data object on the memory device to register the data object on the memory device. The processing logic can thus, at operation 423, register the data object on the memory device by associating the data object with an object ID and indicating that the data object is subject to snapshotting in a metadata item.

In some embodiments, the processing logic can modify, at operation 424 the data object on the memory device. The processing logic can, at operation 425, modify the portions of the data object and record portions of the data object in different address ranges of the physical memory address space. For example, the data object can initially be made up of unmodified data portions, each of which resides in a corresponding address range in the physical memory address space. The processing logic can then modify some of the portions of the data object and record the modified portions of the data object in different corresponding addresses in the physical memory address space. For instance, the processing logic can receive commands from a host system indicating changes to the data structure of the data object, and in response, it can modify at operation 425 the data of the data object at the corresponding set of address ranges. The processing logic can also, at operation 425, modify the address ranges associated with the data object.

In some embodiments, the modification of the data object can continue until a predetermined period of time expires or until a triggering event occurs. At that point, the processing logic can, at operation, 426, pause modification of the data object to create a snapshot of the data object and capture its state (i.e., the state of the data structure reflective of the state of a host application/process) at that point in time.

At some time after the creation of the data object, the processing logic can associate the object identifier with a snapshot identifier to define a snapshot of the data of the data object on the memory device. This snapshot can reflect the state of the data of the data object and the locations of the data on the memory device at the time the snapshot was created. The processing logic can, at operation 427, create a snapshot of the data object and associate the device physical address ranges storing the unmodified portions of the data object with corresponding virtual address ranges in virtual memory address space to be associated with the snapshot. For example, the processing logic, at operation 427, can map a snapshot of a data object to a consumer, such as another host application, by associating the physical address ranges of the snapshot with the corresponding virtual address ranges in the virtual address space of the consumer. The consumer to which the processing logic maps the snapshot can be a data mover, which can refer to a process on the same or another host or a direct memory access hardware controller on the memory device or memory sub-system. The mapping can be achieved by, the processing logic, associating (e.g., in a metadata entry/item), at operation 427, the physical address ranges of the snapshot with the corresponding virtual address ranges in the virtual address space of the consumer. In the various embodiments, the processing logic can associate the physical address ranges in the memory device physical memory address space, where the data of the snapshot of the data object resides, with a snapshot identifier. In some embodiments, the device virtual address ranges where the data of the snapshot of the data object resides can be completely different from device virtual address ranges where the data of the data object resides or can coincide with it. Although the physical address ranges of the snapshot and the data object may initially coincide, the physical address ranges of the data object can change if the data object is modified, thus affecting the overlap of physical address ranges of the snapshot and those of the data object. Accordingly, the same data portions, identified by their respective device physical address ranges in device physical address space, can be mapped to multiple different corresponding device virtual address ranges in device virtual address space. Thus, the processing logic can distinguish accesses to a snapshot of a data object from accesses to the data object itself by directing the access requests and commands to different corresponding virtual address ranges and different corresponding physical address ranges, depending on whether the request or command is coming from a producer or a consumer.

The processing logic can then, at operation 428, make a checkpoint copy of the data of the data object reflected by the snapshot, for example, by copying the snapshot to another location such as another memory device, a remote device, or a non-volatile storage device. For example, at operation 429, the processing logic can transmit the data residing in the set of address ranges identified by the snapshot identifier to a data storage device that is composed of non-volatile media.

At the same time or overlapping in duration with the copying of the snapshot at operation 428, the processing logic can, at operation 430 resume modifying the data object on the memory device, by continuing, at operation 431, to receive or accept commands from the host or host application to make changes to the data object. The processing logic can, at operation 432, edit the data of the data object concurrently with the snapshot being copied to a different location. These mechanisms allow the processing logic to maintain the current state of the data object while also creating a checkpoint copy of its previous state.

Further details regarding the making checkpoint copies of program states using snapshots on memory devices from the perspective of a host system are explained below with reference to FIG. 5.

Figure 5:
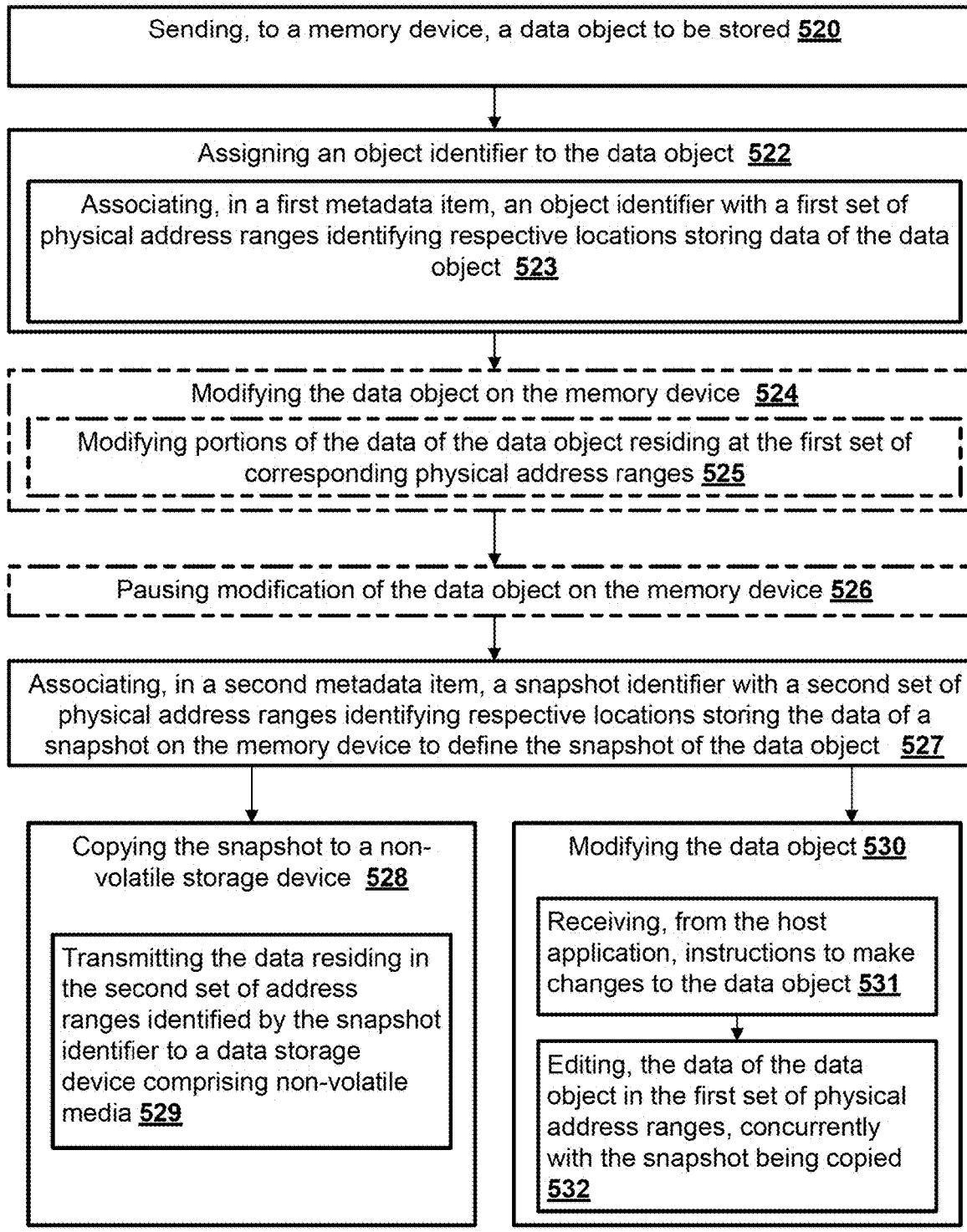
FIG. 5 is a flow diagram of an example method for making checkpoint copies of program states using snapshots from memory devices in accordance with some embodiments of the present disclosure.

FIG. 5 is a flow diagram of an example method 500 for making checkpoint copies of program states using snapshots on memory devices in accordance with some embodiments of the present disclosure from the perspective of a host system. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the snapshot management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In several embodiments described herein, one or more operations of example method 500 can be performed together with or instead of one or more operations of the other example methods 300, 400.

In several embodiments, at operation 520, the processing logic can send, to a memory device, a data object to be stored. The processing logic can map portions of the memory device physical memory space to portions of the host physical memory space to associate the respective address mappings between the memory device and the host system. Just like the mapping of physical address ranges to corresponding virtual address ranges in the memory device, the host system can map a representation of the data object to some addresses within the host virtual memory address space allocated to a host application. The host virtual address ranges containing portions of the data object in the host virtual memory address space can be associated with corresponding host physical address ranges in the host physical memory address space of the host system.

Thus, at operation 522, the processing logic can assign an object identifier to the data object. Accordingly, in various embodiments, the processing logic can associate, at operation 523, the host physical address ranges in the host physical memory address space where the data of the data object resides with a data object identifier. For example, the processing logic can, at operation 523, associate, in a metadata item, an object identifier with a set of physical address ranges identifying respective locations storing data of the data object.

At operation 524, the processing logic can modify the data object on the memory device. For example, the processing logic can, at operation 525, modify portions of the data of the data object residing at the first set of corresponding physical address ranges. In some embodiments, the processing logic can, at operation 525, modify the portions of the data object and record portions of the data object in different host physical address ranges of the physical memory address space.

In some embodiments, the processing logic can, at operation 526, pause the modification of the data object on the memory device. In several embodiments, the processing logic can, at operation 526, pause modification of the data object on the memory device of the memory sub-system at the expiration of a predetermined period of time or upon registering a triggering event.

Accordingly, the processing logic can create a snapshot of a data object by stopping the modification of the data object at a particular point in time. Similarly to the description of FIG. 4 above provided from the perspective of the memory device, the creation and registration of a snapshot of the data object can be performed from the perspective of a host system as well. After the creation of the data object, the processing logic can create, at operation 527, a snapshot of the data object and associate the host physical address ranges storing the unmodified portions of the data object with corresponding host virtual address ranges in host virtual memory address space allocated to another host application. In the various embodiments the processing logic, at operation 527, can associate, in a metadata item, a snapshot identifier with a set of physical address ranges identifying respective locations storing the data of a snapshot on the memory device to define the snapshot of the data object. In some embodiments, the host virtual address ranges where the data of the snapshot of the data object resides can be completely different from the host virtual address ranges where the data of the data object resides or can coincide with it. In this manner, the same data portions can be mapped to multiple different corresponding host virtual address ranges in host virtual memory address spaces.

In some embodiments, having created the snapshot, the processing logic can make a checkpoint copy of the data of the data object reflected by the snapshot. For example, the processing logic can copy the snapshot from the memory device to another location, such as a remote data storage device. In the same or other examples, the processing logic can, at operation 528, copy the snapshot to a non-volatile storage device. For example, at operation 529, the processing logic can transmit the data residing in the second set of address ranges identified by the snapshot identifier to a data storage device comprising non-volatile media. The data can be transmitted from the memory device through the host device to the remote data storage device.

At the same time or overlapping in duration with the copying of the snapshot at operation 528, the processing logic can, at operation 530 resume modifying the data object on the memory device, by continuing, at operation 531, to send commands to the memory device to make changes to the data object. The processing logic can, at operation 432, edit the data of the data object (i.e., in its corresponding set of physical address ranged) concurrently with the snapshot being copied to a different location. These mechanisms allow the processing logic to maintain the current state of the data object while also creating a checkpoint copy of its previous state.

Figure 6:
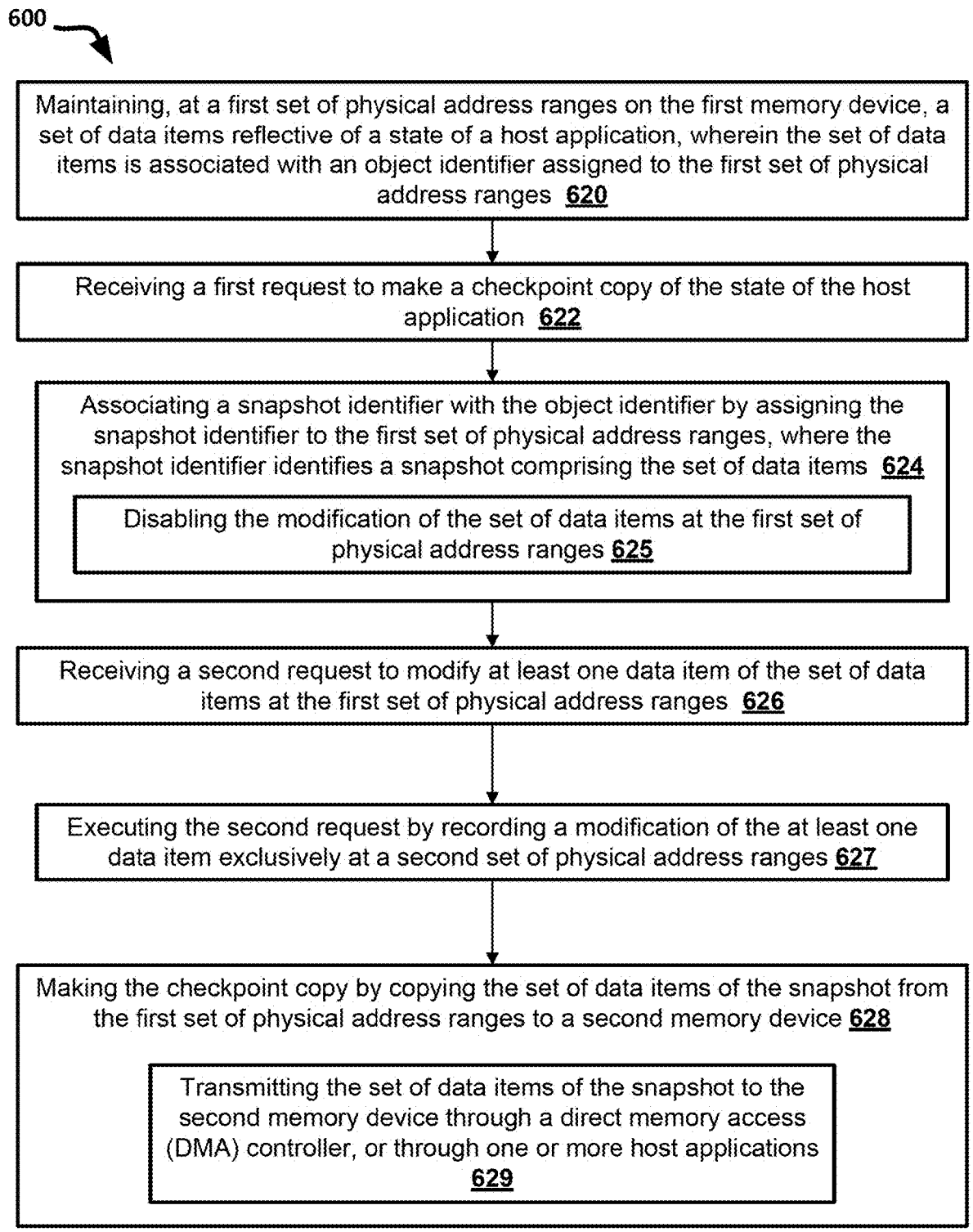
FIG. 6 is a flow diagram of an example method for making checkpoint copies of program states using snapshots from memory devices in accordance with some embodiments of the present disclosure.

FIG. 6 is a flow diagram of an example method 600 for making checkpoint copies of program states using snapshots on memory devices in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the snapshot management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In several embodiments described herein, one or more operations of example method 600 can be performed together with or instead of one or more operations of the other example methods 300, 400, 500.

In some embodiments, at operation 620, the processing logic can maintain, on a memory device, a set of data items reflective of a state of a host application. The processing logic can maintain this set of data items can in a first set of physical address ranges on a memory device (e.g., memory device 130 of FIG. 1A). The set of data items can form a data object having an object identifier associated with it in a metadata entry. In some embodiments, this set of data items can be associated with the object identifier assigned to the first set of physical address ranges.

In the various embodiments, the processing logic can, at operation 622, receive a request to make a checkpoint copy of the state of the host application. The processing logic can receive this request from a host system or from another component of the memory sub-system. In response to receiving this request at operation 622, the processing logic can, at operation 624, associate a snapshot identifier with the object identifier by assigning the snapshot identifier to a first set of physical address ranges. In some embodiments, the associations between a set of data items and a corresponding object identifier, set of memory address ranges, and snapshot identifier can be recorded in corresponding metadata entries in a data structure. The snapshot identifier can identify a snapshot that includes the set of data items. Accordingly, in this manner, these data items can become part of the snapshot as indicated by the associated object identifier and associated set of address ranges.

In some embodiments, assigning the snapshot identifier to the first set of physical address ranges, at operation 624, can include, at operation 625, the processing logic disabling the modification of the set of data items at the first set of physical address ranges of the memory device. Disabling the modification of the data items in this set of physical address ranges can entail blocking subsequent requests to modify the data items from being executed at this first set of physical address ranges or can entail directing these requests to another location. For example, disabling the modification of the set of data items at the first set of physical address ranges can include processing logic causing subsequent requests to modify a data item of the set of data items to be executed in the second set of physical address ranges. These requests to modify a data item in this set of data items (i.e., to modify a data portion making up that data object) can be received, at operation 626, from either a host system, a host application, or another component of the memory sub-system.

Accordingly, in some embodiments, at operation 626, the processing logic can receive a request to modify at least one data item of the set of data items at the first set of physical address ranges of the memory device. In some cases, the request to make a checkpoint copy and the request to modify at least one data item can be received from different components. For example, the processing logic can receive the request to make a checkpoint copy from a host system, host application, or a component of the memory sub-system and can receive the request to modify at least one data item from a different host system, different host application, or a different component of the memory sub-system.

In some embodiments, these requests to modify a data item at an address in the first set of physical address ranges can be treated differently after the snapshot is associated with this set of physical address ranges (i.e., after the snapshot is registered). For example, the processing logic can, at operation 627, execute the request (i.e., a request received subsequent to the snapshot being registered and associated with this set of physical address ranges) by recording the requested modification of the data item exclusively at another set of physical address ranges. That is, instead of causing the execution of this subsequently received request to modify one or more data items at the set of physical address ranges (i.e., set of physical address ranges the that has been associated with the snapshot), the processing logic can execute the request at a different set of physical address ranges.

In the various embodiments, the processing logic can, at operation 628, make the checkpoint copy by copying the set of data items of the snapshot from the first set of physical address ranges on the memory device (i.e., the set of physical address ranges associated with the snapshot) to another memory device or to another location on the same memory device. The other memory device can be a non-volatile memory device that includes persistent memory. In some embodiments, at operation 629, the processing logic can transmit the set of data items of the snapshot to the second memory device through a DMA controller. In these or other embodiments, the processing logic can transmit the set of data items of the snapshot to the second memory device through one or more host applications.

After the checkpoint copy is created at operation 628, the processing logic can then begin permitting requested modifications to be executed at that first set of physical address ranges. For example, responsive to making the checkpoint copy, the processing logic can enable the modification of the set of data items at the first set of physical address ranges (i.e., re-enable the modification of the data object at the set of physical address ranges that were associated with the snapshot). In some cases, the processing logic can stop blocking requests for modifications to be made at that first set of physical address ranges or it can stop redirecting those requests to the other set of physical address ranges. In some of these embodiments, the duration of the processing logic copying the set of data items of the snapshot to the other memory device can at least partially coincide with the duration of recording the modification. Thus, in this manner, the creation of the checkpoint copy by copying the snapshot to another memory device can at least partially overlap in time with a modification being recorded at the second set of physical address ranges on the memory device. Therefore, in some of these embodiments, because the requested modification of a data item of the data object can occur at a different address range than the address ranges that store the snapshot, the checkpoint copy can be made from the snapshot at the same time that the data object is being modified at another set of physical address ranges of the memory device.

In certain embodiments, the processing logic is capable of retaining, at operation 620, a collection of data items on a memory device that reflect the state of a host application. This collection of data items can be kept in a particular set of physical address ranges on the memory device, and can take the form of a data object that is connected with an object identifier in a metadata entry. Additionally, in some cases, this data item set can be associated with the object identifier that is assigned to the first set of physical address ranges. Thus, in several embodiments, at operation 620, the processing logic can maintain, at a first set of physical address ranges on the first memory device, a set of data items reflective of a state of a host application, where the set of data items is associated with an object identifier assigned to this first set of physical address ranges.

In different embodiments, at operation 622, the processing logic can receive a first request to make a checkpoint copy of the state of the host application. For example, the processing logic can receive a request to produce a checkpoint copy of the state of the host application from a host system or another element of the memory subsystem. Responsive to receiving this request, the processing logic can at operation 624, associate a snapshot identifier with the object identifier. In some cases, following receipt of this request, the processing logic can link the snapshot identifier with the object identifier by assigning the snapshot identifier to the first set of physical address ranges, where the snapshot identifier identifies a snapshot comprising the set of data items. In some embodiments, the relationships between a set of data objects and their corresponding object identifier, memory address ranges, and snapshot identifier can be registered in a metadata entry in a data structure. The snapshot identifier serves to identify a snapshot that includes the set of data items. Thus, these data items become part of the snapshot as indicated by the associated object identifier and set of address ranges.

In certain embodiments, the processing logic can, at operation 626, disable the modification of the set of data items at the first physical address range of the memory device by assigning the snapshot identifier to the first set of physical address ranges. To accomplish this, blocking subsequent requests to modify data items from being executed at this first set of physical address ranges or directing these requests to another location may be required. For example, to disable the modification of the set of data items at the first set of physical address ranges, the processing logic can, at operation 627, execute subsequent requests to modify a data item of the data set in the second set of physical address ranges. These requests can be received from a host system, a host application, or another component of the memory subsystem. Thus, in some embodiments, assigning the snapshot identifier to the first set of physical address ranges at operation 624, can include disabling, at operation 625, the modification of the set of data items at the first set of physical address ranges. In these or other embodiments, the processing logic disabling the modification of the set of data items at the first set of physical address ranges can cause subsequent requests to modify the at least one data item of the set of data items to be executed in the second set of physical address ranges.

Consequently, at operation 626, the processing logic can receive a request to change at least one data item of the data set in the first set of physical address ranges of the memory device. This request to modify at least one data item of the set of data items at the first set of physical address ranges can be a different type of request than the request to make a checkpoint copy of the host application. In certain situations, the request to create a checkpoint copy and the request to modify at least one data item can originate from different components. For example, the processing logic can, at operation 626, receive the request to create a checkpoint copy from a host system, host application, or component of the memory subsystem, and separately receive the request to modify at least one data item from another host system, host application, or component of the memory subsystem.

In some embodiments, the processing logic can handle requests to modify a data item at an address in the first set of physical address ranges differently after the snapshot is associated with this physical address range (i.e., after the snapshot is registered) than before the snapshot is associated with. For example, after the association at operation 624, the processing logic can, at operation 627, execute the request by recording the requested modification of the data item exclusively at another set of physical address ranges (i.e., different from the first physical address range). Thus, instead of causing the execution of the request to modify one or more data items to take place at the set of physical address ranges associated with the snapshot, the processing logic can execute the request at a different set of physical address ranges.

In the different embodiments, the processing logic can, at operation 628, produce the checkpoint copy by copying the set of data items of the snapshot from the first set of physical address ranges on the memory device (i.e., the physical address range associated with the snapshot) to another memory device or to another location on the same memory device. The other memory device can be a non-volatile memory device that includes persistent memory. In some embodiments, at operation 629, the processing logic can transmit the set of data items of the snapshot to the second memory device through a DMA controller or through one or more host applications.

After the checkpoint copy is created, the processing logic can permit requested modifications to be made at the first set of physical address ranges. The processing logic can re-enable modification of the set of data items in the first set of physical address ranges, allowing subsequent modification requests to be executed at that location (i.e., instead of or in addition to being executed at the second set of physical address ranges). The processing logic can stop blocking or redirecting modification requests to the second set of physical address ranges. In some embodiments, the duration of copying the set of data items to the other memory device can partially overlap with the duration of recording modifications. This overlap allows the checkpoint copy to be made while the data object is being modified at another set of physical address ranges on the memory device.

Figure 7:
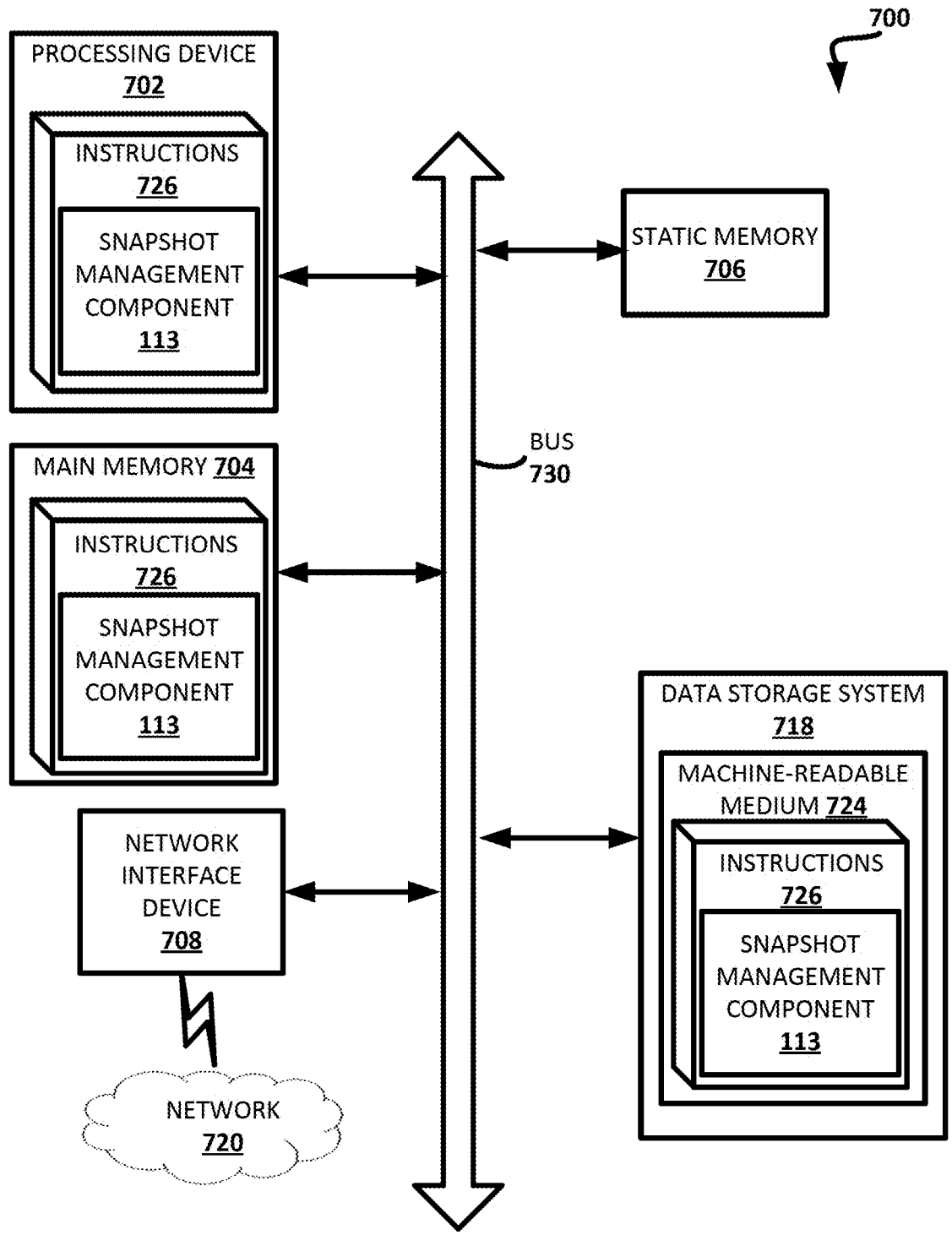
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the snapshot management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a SMC (e.g., the snapshot management component 113 of FIG. 1 and the methods 300, 400, 500, and 600 of FIGS. 3, 4, 6, and 6 respectively). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a first memory device; and
   a processing device operatively coupled with the first memory device, to perform operations comprising:
   maintaining, at a first set of physical address ranges on the first memory device, a set of data items reflective of a state of a host application, wherein the set of data items is associated with an object identifier assigned to the first set of physical address ranges;
   receiving a first request to make a checkpoint copy of the state of the host application;
   responsive to receiving the first request, associating a snapshot identifier with the object identifier by assigning the snapshot identifier to the first set of physical address ranges, wherein the snapshot identifier identifies a snapshot comprising the set of data items;
   receiving a second request to modify at least one data item of the set of data items at the first set of physical address ranges;
   executing the second request by recording a modification of the at least one data item exclusively at a second set of physical address ranges; and
   making the checkpoint copy by copying the set of data items of the snapshot from the first set of physical address ranges to a second memory device.

2. The system of claim 1, wherein assigning the snapshot identifier to the first set of physical address ranges disabling the modification of the set of data items at the first set of physical address ranges, and wherein the processing device is to perform the operations further comprising:
   responsive to making the checkpoint copy, enabling the modification of the set of data items at the first set of physical address ranges.

3. The system of claim 2, wherein disabling the modification of the set of data items at the first set of physical address ranges causes subsequent requests to modify the at least one data item of the set of data items to be executed in the second set of physical address ranges.

4. The system of claim 1, wherein a duration of copying the set of data items of the snapshot to the second memory device at least partially coincides with the duration of recording the modification.

5. The system of claim 1, wherein copying the set of data items of the snapshot to the second memory device comprises:
   transmitting the set of data items of the snapshot to the second memory device through a direct memory access (DMA) controller, or transmitting the set of data items of the snapshot to the second memory device through one or more host applications.

6. The system of claim 1, wherein receiving the first request comprises receiving the first request from a first host system and receiving the second request comprises receiving the second request from a second host system.

7. The system of claim 1, wherein the first memory device is a fabric-attached byte-addressable memory device.

8. A non-transitory computer-readable storage medium comprising instructions that, when executed by a processing device, cause the processing device to perform operations comprising:
   maintaining, at a first set of physical address ranges on a first memory device, a set of data items reflective of a state of a host application, wherein the set of data items is associated with an object identifier assigned to the first set of physical address ranges;
   receiving a first request to make a checkpoint copy of the state of the host application;
   responsive to receiving the first request, associating a snapshot identifier with the object identifier by assigning the snapshot identifier to the first set of physical address ranges, wherein the snapshot identifier identifies a snapshot comprising the set of data items;
   receiving a second request to modify at least one data item of the set of data items at the first set of physical address ranges;

executing the second request by recording a modification of the at least one data item exclusively at a second set of physical address ranges; and making the checkpoint copy by copying the set of data items of the snapshot from the first set of physical address ranges to a second memory device.

9. The non-transitory computer-readable storage medium of claim 8, wherein assigning the snapshot identifier to the first set of physical address ranges comprises:

disabling the modification of the set of data items at the first set of physical address ranges, and wherein the processing device is to perform the operations further comprising:

responsive to making the checkpoint copy, enabling the modification of the set of data items at the first set of physical address ranges.

10. The non-transitory computer-readable storage medium of claim 9, wherein disabling the modification of the set of data items at the first set of physical address ranges causes subsequent requests to modify the at least one data item of the set of data items to be executed in the second set of physical address ranges.

11. The non-transitory computer-readable storage medium of claim 8, wherein a duration of copying the set of data items of the snapshot to the second memory device at least partially coincides with the duration of recording the modification.

12. The non-transitory computer-readable storage medium of claim 8, wherein copying the set of data items of the snapshot to the second memory device comprises:

transmitting the set of data items of the snapshot to the second memory device through a direct memory access (DMA) controller, or transmitting the set of data items of the snapshot to the second memory device through one or more host applications.

13. The non-transitory computer-readable storage medium of claim 8, wherein receiving the first request comprises receiving the first request from a first host system and receiving the second request comprises receiving the second request from a second host system.

14. The non-transitory computer-readable storage medium of claim 8, wherein the first memory device is a fabric-attached byte-addressable memory device.

15. A method comprising:

storing, at a first location on a first memory device, a data object comprising a set of data items, the data object reflective of a state of a host application, wherein the data object is associated with an object identifier, and wherein the object identifier is assigned, in a first metadata item, to a first set of physical address ranges identifying the first location;

receiving a request to create a checkpoint copy of the state of the host application;

responsive to receiving the request, associating a snapshot identifier with the object identifier by assigning, in a second metadata item, the snapshot identifier to the first set of physical address ranges, wherein the snapshot identifier identifies a snapshot comprising the set of data items;

receiving a subsequent request to modify at least one data item of the set of data items at the first location;

executing the subsequent request by recording a modification of the at least one data item exclusively at a second set of physical address ranges collectively identifying a second location on the first memory device; and creating the checkpoint copy of the state of the host application by copying the set of data items of the snapshot from the first location of the first memory device to a second memory device.

16. The method of claim 15, wherein assigning the snapshot identifier to the first set of physical address ranges comprises disabling the modification of the set of data items of the data object at the first set of physical address ranges, the method further comprising:

responsive to creating the checkpoint copy, enabling the modification of the set of data items of the data object at the first set of physical address ranges.

17. The method of claim 16, wherein disabling the modification of the set of data items at the first set of physical address ranges causes subsequent requests to modify the at least one data item of the set of data items to be executed in the second set of physical address ranges.

18. The method of claim 15, wherein copying the set of data items of the snapshot to the second memory device comprises:

transmitting the set of data items of the snapshot to the second memory device through a direct memory access (DMA) controller, or transmitting the set of data items of the snapshot to the second memory device through one or more host applications.

19. The method of claim 15, wherein recording a modification at least partially overlaps in time with copying of set of data items of the snapshot.

20. The method of claim 15, wherein the first memory device is a fabric-attached byte-addressable memory device.

* * * * *